United States Patent [19]

Roskowski et al.

[11] Patent Number: 5,624,316

[45] Date of Patent: Apr. 29, 1997

[54] VIDEO GAME ENHANCER WITH INTERGRAL MODEM AND SMART CARD INTERFACE

[75] Inventors: Steven G. Roskowski, San Jose; Stephen G. Perlman, Mountain View, both of Calif.

[73] Assignee: Catapult Entertainment Inc., Cupertino, Calif.

[21] Appl. No.: 254,154

[22] Filed: Jun. 6, 1994

[51] Int. Cl.⁶ .................................................. A63F 9/24
[52] U.S. Cl. .................................... 463/45; 463/41
[58] Field of Search .............................. 273/433, 436, 273/439, DIG. 28, 148 B; 364/410, 411; 463/45, 41

[56] References Cited

U.S. PATENT DOCUMENTS

| | | |
|---|---|---|
| 4,518,823 | 5/1985 | Kessler . |
| 4,520,477 | 5/1985 | Wen . |
| 4,570,930 | 2/1986 | Mattheson .................. 273/DIG. 28 X |
| 4,572,509 | 2/1986 | Sitzick ....................... 273/DIG. 28 X |
| 4,592,546 | 6/1986 | Fascenda et al. ......................... 273/1 E |
| 4,799,635 | 1/1989 | Nakagawa ................................ 364/900 |
| 4,905,280 | 2/1990 | Wiedmier . |
| 4,980,897 | 12/1990 | Decker et al. .............................. 375/38 |
| 4,998,199 | 3/1991 | Tashiro et al. . |
| 5,013,038 | 5/1991 | Luxenberg et al. ....................... 273/439 |
| 5,048,831 | 9/1991 | Sides . |
| 5,070,479 | 12/1991 | Nakagawa .............................. 395/575 |
| 5,083,800 | 1/1992 | Lockton ................................... 273/439 |
| 5,112,051 | 5/1992 | Darling et al. . |
| 5,120,076 | 6/1992 | Luxenberg et al. ....................... 273/439 |
| 5,155,768 | 10/1992 | Matsuhara ................................. 380/23 |
| 5,161,803 | 11/1992 | Ohara ....................................... 273/435 |
| 5,166,866 | 11/1992 | Molnar et al. . |
| 5,184,282 | 2/1993 | Kaneda et al. . |
| 5,203,848 | 4/1993 | Wang . |
| 5,282,621 | 2/1994 | Tsing . |
| 5,291,189 | 3/1994 | Otake et al. .............................. 340/799 |

FOREIGN PATENT DOCUMENTS

| | | |
|---|---|---|
| 0402067 | 6/1990 | European Pat. Off. . |
| 0481770 | 10/1991 | European Pat. Off. . |
| 0571213 | 5/1993 | European Pat. Off. . |
| 0571138 | 5/1993 | European Pat. Off. . |
| 9323125 | 11/1993 | United Kingdom . |

*Primary Examiner*—Jessica Harrison
*Assistant Examiner*—Michael O'Neill

[57] ABSTRACT

A video game enhancement system for modifying and enhancing the operation of a video game is disclosed. The system includes: 1) a processor interface for coupling the video game enhancement system with a processor; 2) a memory interface for coupling the video game enhancement system with a first memory having executable game logic residing therein; 3) a second memory having executable enhancement logic residing therein; and 4) control logic including: a) logic for detecting an access to a patch address by the processor; b) logic for directing the processor to access an exception region in the second memory upon detection of the access to the patch address, the access to the exception region causing activation of an exception mode; and c) redirection logic for redirecting memory accesses by the processor from the first memory to the second memory for a plurality of memory accesses upon activation of the exception mode, the processor thereby executing a portion of the executable enhancement logic. The the control logic of the video game enhancement system also includes: 5) logic for detecting an access to a transition address by the processor; 6) logic for directing the processor to terminate the exception mode upon detection of the access to the transition address; and 7) the redirection logic further includes logic for redirecting memory accesses by the processor from the second memory to the first memory upon termination of the exception mode, the processor thereby continuing execution of the executable game logic.

18 Claims, 21 Drawing Sheets

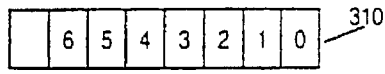

ADDRESS MAP CONTROL REGISTER

```
0: RAM/ROM_SWAP                 0 = ROM LOW, RAM HIGH
1: ENABLE_EXCEPTION_REGION      0 = DISABLED, 1 = ENABLED
2: ENABLE_RAM_CODE_REGION       0 = DISABLED, 1 = ENABLED
3: ENABLE_ROM_CODE_REGION       0 = DISABLED, 1 = ENABLED
4. ENABLE_PATCH_ADDRESS         0 = DISABLED, 1 = ENABLED
5: ENABLE_DMA_X_REGION          0 = DISABLED, 1 = ENABLED
6: ENABLE_DMA_Y_REGION          0 = DISABLED, 1 = ENABLED
7: RESERVED
```

DEPENDENCIES:
1. WHILE CARTRIDGE_ENABLED = 0, MEMORY IS MAPPED AS IF BITS 1-6 ARE DISABLED
2. WHILE CARTRIDGE_ENABLED = 1, BIT 0 HAS NO EFFECT
3. WHILE EXCEPTION_MODE = 0, MEMORY IS MAPPED AS IF BITS 2 AND 3 ARE DISABLED

INITIALIZATION UPON SYSTEM_RESET:
ALL BITS = 0

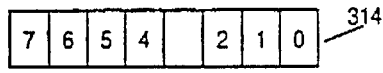

TRANSITION CONTROL REGISTER

```
0: ENABLE_CARTRIDGE             0 = DISABLED, 1 = ENABLED
1: DECREMENT_EXCEPTION_COUNTER  0 = DISABLED, 1 = ENABLED
2: CLEAR_EXCEPTION_COUNTER      0 = DISABLED, 1 = ENABLED
3: RESERVED
4: SMART_CARD_TX_READY          0 = NOT READY, 1 = READY
5: SMART_CARD_RX_READY          0 = NOT READY, 1 = READY
6: TX_FIFO_FULL (READ-ONLY)     0 = NOT FULL, 1 = FULL
7: RX_FIFO_EMPTY (READ-ONLY)    0 = NOT EMPTY, 1 = EMPTY
```

DEPENDENCIES:
1. WRITES TO TRANSITION CONTROL REGISTER SET TRANSITION_REGISTER_WRITE FOR 1 CYCLE
2. SPECIFIED TRANSITIONS DO NOT TAKE EFFECT UNTIL THE TRANSITION_ADDRESS IS ACCESSED

INITIALIZATION UPON SYSTEM_RESET:
1. IF ENHANCER_ENABLE = 1, SMART_CARD_TX_READY = 1, OTHER BITS = 0
2. IF ENHANCER_ENABLE = 0, ENABLE_CARTRIDGE = 1, SMART_CARD_TX_READY = 1, OTHER BITS = 0

NOTE:
THE ADDRESS MAP CONTROL REGISTER AND TRANSITION CONTROL REGISTER ARE ALWAYS MAPPED TO THE TOP OF THE EXCEPTION_REGION AND ARE THEREFORE ACCESSIBLE WHENEVER THE EXCEPTION_REGION IS ACCESSIBLE.

FIG. 12

ENHANCER RAM ADDRESS MAP RELATIVE
TO LOCAL ADDRESS BUS

VIDEO GAME ENHANCER WITH INTERGRAL MODEM AND SMART CARD INTERFACE

CROSS-REFERENCE TO RELATED APPLICATIONS

The following co-pending U.S. patent applications relate to the present application. Each of the listed co-pending applications are assigned to the same assignee as the present application.

1) U.S. patent application Ser. No. 08/238,630, filed May 5, 1994, and titled, "AN IMPROVED NETWORK ARCHITECTURE TO SUPPORT REAL-TIME VIDEO GAMES"

2) U.S. patent application Ser. No. 08/238,477, filed May 5, 1994, and titled, "AN IMPROVED NETWORK ARCHITECTURE TO SUPPORT MULTIPLE SITE REAL-TIME VIDEO GAMES"

3) U.S. patent application Ser. No. 08/238,456, filed May 5, 1994, and titled, "AN IMPROVED MODEM TO SUPPORT MULTIPLE SITE CALL CONFERENCED DATA COMMUNICATIONS."

4) U.S. patent application Ser. No. 08/238,303, filed May 5, 1994, and titled, "AN IMPROVED NETWORK ARCHITECTURE TO SUPPORT RECORDING AND PLAYBACK OF REAL-TIME VIDEO GAMES".

BACKGROUND OF THE INVENTION

1. Field of the Invention

The present invention relates to the field of video game systems and networked computer systems.

2. Description of Related Art

Home video game machines such as the "SEGA GENESIS™" and the "SUPER NINTENDO ENTERTAINMENT SYSTEM™" are designed to function primarily as computing, graphics, and sound engines for video game software provided on insertable ROM-based cartridges. "SEGA™" and "SEGA GENESIS™" are trademarks of "SEGA, INC.™" "SUPER NINTENDO ENTERTAINMENT SYSTEM™" and "NINTENDO™" are trademarks of Nintendo, Inc. Such video game software is created by "SEGA™" and "NINTENDO™" as well as various third-party software vendors and is available at retail outlets throughout the world. Such ROM-based cartridge games are written to be played by 1, 2, or possibly 4 or more players at once, with each player utilizing a controller attached to the video game machine.

Because such games are ROM-based, once the software is frozen into a ROM, it cannot be modified substantially in the field. Thus, once a cartridge is manufactured and sold to the customer, the execution of the game is essentially locked-in. If the customer, manufacturer, or another party desires to substantially enhance the functionality of an existing video game cartridge, it is necessary to redesign the software and manufacture and distribute the modified cartridge with a new ROM. Clearly, this is an extremely expensive solution, and it would be desirable to provide a convenient and cost-effective means by which video game software could be enhanced in the field.

In the past few years video game enhancement devices have appeared that allow minor modification to the execution of video game cartridges in the field. A well-known such device is the "GAME GENIE™", by "GALOOB™". "GAME GENIE™" and "GALOOB™" are trademarks of "GALOOB INC.™" The Game Genie (and like devices) plugs into a video game console's cartridge slot, and then the video game cartridge which the user desires to enhance is plugged into a cartridge connector on top of the "GAME GENIE™". When power is applied to the video game console, the "GAME GENIE™" intercepts the video game's processor accesses intended for the ROM cartridge, and directs the processor to execute out of a "GAME GENIE™" ROM. This ROM contains a small amount of software that puts up a graphics image and requests the user to enter special codes with a video game controller. The user, referring to a printed list of special codes either provided by the manufacturer or some other source (e.g. a video game magazine), then enters the codes for the desired enhancement of the game. These special codes specify memory addresses and data values. Once the codes are entered, the "GAME GENIE™" will turn over control to the game cartridge, and normal game execution will begin. However, when the processor attempts to fetch data from one of the addresses which had been entered as a code, the "GAME GENIE™" will intercept the transaction (it has an address comparator for each address it intercepts) and substitute the entered data value instead. Because the "GAME GENIE™" can only substitute the values of a small number of individual data words, the achievable modifications to video game cartridges are fairly slight, such as increasing the number of lives permitted before the game ends or whether the background soundtrack is on or off. Yet, even given the relatively modest changes to video games possible with the "GAME GENIE™", the product has been extremely successful commercially.

Clearly, there are many applications that would be enabled if there were a means to make substantial modifications to video game cartridges in the field. Rather than simply slightly changing the attributes of existing characters in the game, entirely new characters could be introduced. Rather than just turning on or off the soundtrack, whole new soundtracks could be introduced. Modifications could also include temporary graphics or sounds that are briefly presented to the user in the form of an advertisement. In addition, peripheral devices such as modems or special game controllers, could be interfaced to the game such that the game could take advantage of them, even if the original authors of the game had no intention of supporting such peripherals.

Unfortunately, modifications such as those just described are far too extensive to be accomplished by a simple data word replacement device such as the "GAME GENIE™" (and other devices like Game Genie). Game Genie provides for the substitution of about a dozen bytes in the original cartridge. For new graphics and sound, thousands of new bytes of data are required, some replacing existing data in the cartridge, some in addition to existing data in the cartridge. Also, the "GAME GENIE™" architecture requires specific hardware to detect the memory address of each new word to be substituted on the cartridge. Given that many of the just described enhancements require thousands of new words to be substituted on the cartridge, it can easily be seen that it is impractical to simply extend the "GAME GENIE™" architecture to provide thousands of individual address comparators. Such a "multi-thousand-word" "GAME GENIE™" would be difficult to create at any cost, but would be certainly far too expensive for the home video game market.

Even if we provide a new video game enhancement device that, through some other means, can substitute or add thousands of words of data to an existing video game cartridge, we will quickly find that is impractical to distribute the new data in printed form (as it is today—in the form of codes—for "GAME GENIE™"). While it is reasonable for a person to have to enter four codes in order to enhance a video game experience, it is not reasonable to have to enter 40 —or for that matter 40,000. Although the new data could be distributed in ROM or on floppy disks, the cost of the distribution media (if we include the cost of the readers for the distribution media), approaches or exceeds the cost of a new video game cartridge itself. The home video game market is targeted at children and young adults and is very cost sensitive. Clearly, a low-cost distribution means for new data would be required for a video game enhancement device to be successful.

Thus, a video game enhancement device that provides substantial enhancements is desirable, but technology existing in the art is not capable of substantial enhancements, and extensions of said existing technology to support substantial enhancements is far too expensive, both in terms of the actual hardware cost and the distribution costs for new data.

Another type of video game enhancement device has been recently announced, "THE EDGE™" by "P.F. MAGIC™". Edge and P.F. Magic are trademarks of "P.F. MAGIC, INC.™" This device provides communications capability to a "SEGA GENESIS™" video game console so as to allow two video games to communicate over a telephone line and play a video game or to allow a video game to connect to an on-line service (such as the "IMAGINATION NETWORK™") so as to play on-line video games. "IMAGINATION NETWORK™" is a trademark of "IMAGINATION NETWORK INC.™"

A principal limitation of the Edge is that it is not compatible with existing video game cartridges and it therefore requires completely new video games to be written specifically to take advantage of its communications capabilities to be of any value at all. Given that there are hundreds of existing video game cartridges on the market (none of which are compatible with "THE EDGE™"), and dozens in development that will not be compatible, there are clearly limitations to its usefulness.

Clearly, there would be significant advantage to a video game modem that was compatible with existing video game cartridges. Such a video game modem is not available in prior art systems.

An improved video game enhancer is described herein. It is capable of substantially enhancing existing video game cartridges, and it supports very low-cost distribution means that can conveniently deliver thousands of bytes of new data per game cartridge. One such low-cost distribution means is an integral modem which, by taking advantage of the improved enhancer capabilities, is compatible with existing video game cartridges and allows them to communicate over telephone lines.

SUMMARY OF THE INVENTION

The present invention is a video game enhancement system for modifying and enhancing the operation of a video game. The system includes: 1) a processor interface for coupling the video game enhancement system with a processor; 2) a memory interface for coupling the video game enhancement system with a first memory having executable game logic residing therein; 3) a second memory having executable enhancement logic residing therein; and 4) control logic including: a) logic for detecting an access to a patch address by the processor; b) logic for directing the processor to access an exception region in the second memory upon detection of the access to the patch address, the access to the exception region causing activation of an exception mode; and c) redirection logic for redirecting memory accesses by the processor from the first memory to the second memory for a plurality of memory accesses upon activation of the exception mode, the processor thereby executing a portion of the executable enhancement logic. The the control logic of the video game enhancement system also includes: 5) logic for detecting an access to a transition address by the processor; 6) logic for directing the processor to terminate the exception mode upon detection of the access to the transition address; and 7) the redirection logic further includes logic for redirecting memory accesses by the processor from the second memory to the first memory upon termination of the exception mode, the processor thereby continuing execution of the executable game logic.

BRIEF DESCRIPTION OF THE DRAWINGS

FIG. 12 illustrates the address map and transition control registers of the preferred embodiment.

DETAILED DESCRIPTION OF THE PREFERRED EMBODIMENT

Figure 1:
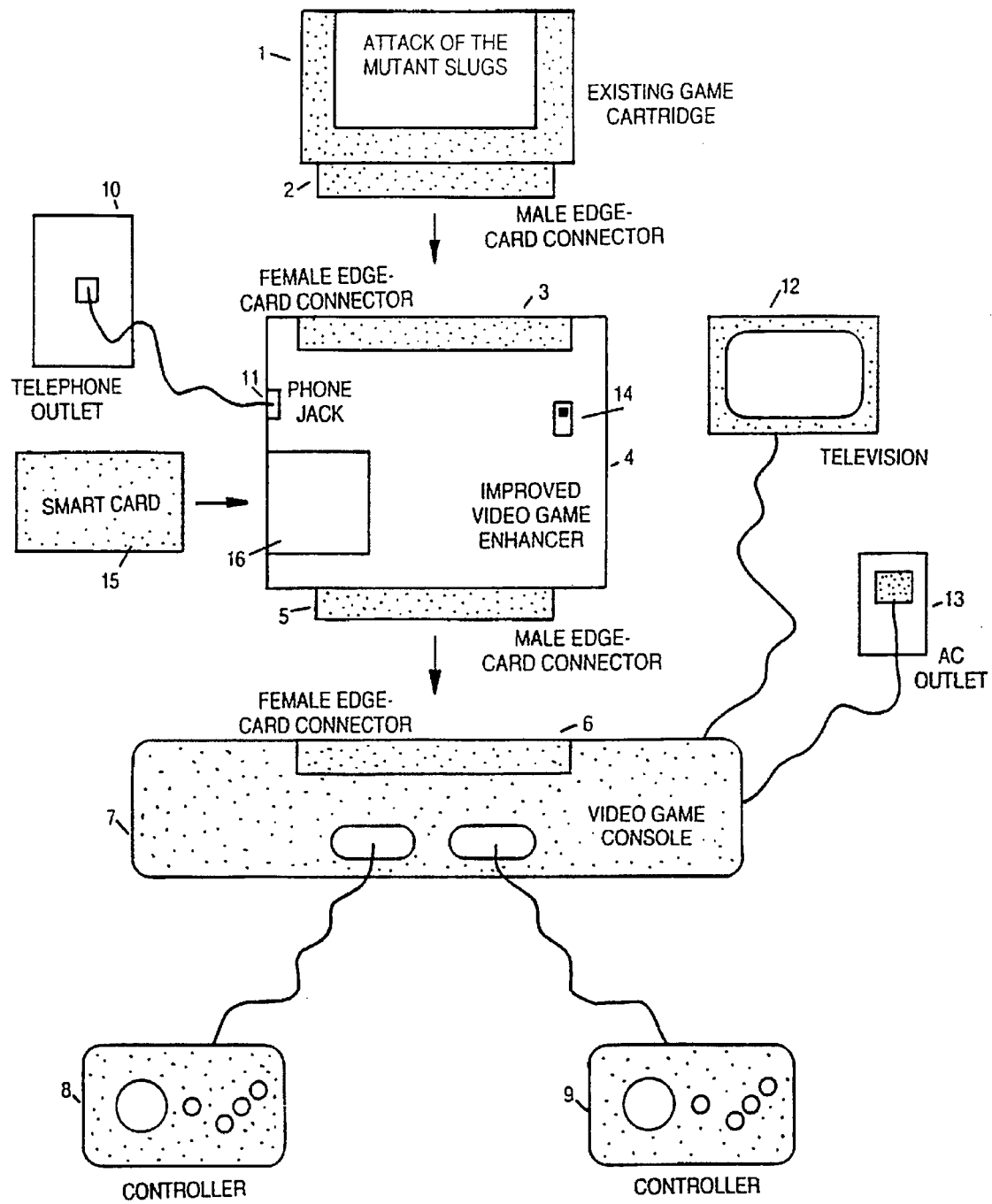
FIG. 1 illustrates the video game enhancer of the present invention.

FIG. 1 illustrates the architecture of the system and how the presently preferred embodiment of an improved video game enhancer is installed by the user. The improved video game enhancer 4 has a male edge-card connector 5 on the bottom and a female edge-card connector 3 on the top. It is inserted into the female edge-card connector of video game console 7 (normally intended for insertion of a video game cartridge). Video game console 7, controllers 8, 9, and television 12 are all well known to those of ordinary sill in the art. Video game cartridge 1 is also well known. The male edge-card connector 2 of a video game cartridge 1 is inserted into the enhancer's female edge-card connector 3. Thus, when properly installed, the enhancer 4 is sandwiched directly between the game cartridge 1 and video game console 7.

The enhancer 4 has a telephone jack 11 to which a telephone cord is connected and plugged into a standard telephone outlet 10. The enhancer 4 has a slot 16 in which a Smart Card (i.e. a credit card with an internal microcomputer and memory) 15 may be inserted. Such Smart Cards are well known to those of ordinary skill in the art.

The video game console 7 is otherwise hooked up as it is normally, with at least one of its controllers 8 and 9 plugged in, and a video/audio or RF output connected to television 12 and an AC transformer attached to AC outlet 13.

The switch 14 has two positions. In one position the enhancer 4 is as disabled and the execution of the software in game cartridge 1 is not affected. In the other position, the enhancer 4 is enabled and the execution of game cartridge 1 may be affected if the enhancer 4 is so configured.

As an overview, the enhancer 4 of the present invention is used in the following manner. Details of the internal operation will be forthcoming later in this document. Consider FIGS. 1 and 2.

Upon power-up or reset with the enhancer 4 enabled, the enhancer 4 intercepts the memory accesses (usually reads, but in some cases writes) of the video game console's CPU 33, and directs the CPU 33 to execute out of the enhancer's 4 internal ROM 28 rather than the ROM 20 of video game cartridge 1. The internal ROM 28 contains operating system software to initialize the enhancer 4 and determine which video game cartridge is installed. Since the enhancer 4 also contains battery backed-up RAM 27, it is able to retain data previously stored in it. This RAM 27 is entirely general purpose and can be used to store any data, but in the presently preferred embodiment it is likely to contain previously stored video game enhancement software, enhancements to the ROM-based operating system, and preference information entered by the user. Also, the enhancer 4 is able to accommodate a Smart Card 15 which may also contain relevant information (e.g. identification, game credits, preferences, game enhancements, etc.). Thus, based on an analysis of the currently connected cartridge 1 and Smart Card 15 as well as an analysis of the current state of the RAM 27, the operating system of the enhancer 4 determines how to initialize itself.

The operating system of the enhancer 4 then directs the video game console to present an audiovisual display on monitor 12 to alert the user of the system of the current system status and give the user an opportunity to specify (using a controller 8 or 9) several control parameters for enhancer 4. For example, if the enhancer 4's operating system determines that there is software already stored in RAM 27 to enhance the attached game cartridge 1, the user will be given an opportunity to activate the enhancements and play the game. If such software is not stored in the RAM 27, the user will be notified that the enhancer 4 needs to obtain such enhancement software to be able to enhance the attached video game cartridge 1. If the user has a Smart Card 15 containing enhancements to the game cartridge 1, Smart Card 15 can be inserted, and the enhancer 4 operating system will download the enhancements to RAM 27. Or, if so directed by the user, the enhancer 4 will use its internal modem 24 and dial up an on-line service through telephone outlet 10 that supports the enhancer 4. If the video game cartridge 1 is supported by the on-line service (and the user has an up-to-date account on the on-line service), the enhancer 4 will download the appropriate game enhancement software from the on-line service and into the internal RAM 27. The transfer complete, the enhancer 4 may hang up, and then notify the user that the needed video game enhancement software is available, and the game, with enhancements, is ready to be played. If the video game cartridge 1 is not supported by the on-line service, the user will be so notified, and no enhancements to the game cartridge 1 will be offered.

In addition to providing the necessary enhancement software for the game cartridge 1, the on-line service can serve as a matchmaker for the user by finding other users with video game enhancers who are playing the same game. If the game cartridge 1 is, for example, a two- (or more than two-) player game (such as MORTAL KOMBAT™ (an up to two-player game) or NBA JAM™ (an up to four-player game)), the enhancement software downloaded from the on-line service includes synchronization and communication enhancements to the video game cartridge 1. "NBA JAM™" is a trademark of "ACCLAIM, INC.™" The on-line service provides the enhancer 4 operating system with the telephone number of another user playing the same game (or provide the telephone number of telephone outlet 10 to another user). Then, the operating system directs the modem 24 to hang up from the on-line service and dial the other user (or await a call from the said other user) and establish a direct telephone modem connection between the enhancer 4 and the other user's enhancer 4. A two- (or more than two-) player video game can then be played between the users. Upon conclusion of the game, the on-line service is called back again, and the results of the game are uploaded to the on-line service. There are many complexities associated with such an on-line service-based peer-to-peer video game network. These details are discussed in separate patent disclosure referenced above.

There are many other enhancements that can be provided to video game cartridge 1, based on data downloaded from the on-line service or read from a Smart Card 15. These include adding new characters to a game, adding new capabilities to existing characters, adding new levels to a game, changing the graphics, changing the soundtrack, correcting bugs in the game software, providing the user with advertisements, keeping track of game statistics, offering game hints and playing tips, providing the user with a means to send electronic mail to other users, providing the user with news and/or sports scores, or augmenting/bug fixing the enhancer's operating system. Further, since the enhancer 4 has battery backed-up RAM, it can maintain on-going statistics such as frequency and type of game usage as well as provide a means for usage based billing. The operating system also can provide the user with billing information regarding the status of an account on the on-line service. The Smart Card 15 can be used to provide secure identification for the user (so as to prevent unauthorized use of the enhancer 4 and/or the on-line service) and can also be used as a credit card or debit card to provide a secure means of purchasing on-line service credits, or other services or merchandise. The Smart Card 15 can either be programmed in the enhancer 4 or programmed at a retail location (e.g. after a payment has been made to a cashier). Or, the Smart Card 15 might only be used as secure identification that links the user to a credit or debit account located on the on-line service. (A large variety of interface-compatible Smart Cards are available commercially at prices starting under US$1.00, from simple identification cards to cards with a large amount of non-volatile storage.)

Thus, the video game enhancer 4 can enhance a video game cartridge 1 if it has already obtained the appropriate enhancement software. If such software is not available in RAM or on a Smart Card, the enhancer 4 can connect to an on-line service and download appropriate enhancement software, if it is available (and if the user has a up-to-date account on the on-line service). Once such software has been downloaded, it will be retained in RAM 27, thereby eliminating the need to reconnect to the on-line service (unless regularly connecting to the on-line service is an aspect of the video game's enhancement—e.g. to be matched with another player to play over the modem, obtain news, exchange electronic mail, or for purposes of charging a usage fee for the enhancement).

The enhancer 4 has a number of advantages over prior art video game enhancers such as the "GAME GENIE™". Because the enhancer 4 is able to augment the existing game cartridge 1 with thousands of bytes of additional data, extensive enhancements to the game cartridge 1 are possible. Because the enhancer 4 contains a modem 24, it is able to download game enhancements inexpensively and with no user intervention from an on-line service. Such game enhancements can be updated literally every minute, and can include the particular enhancement of providing matchmaking services with other users. The modem 24 can also be used for communication with other users. The Smart Card 15 provides another inexpensive means for downloading game enhancements. Smart Cards can also be used as identification cards or as credit and/or debit cards in connection with, or independent of, the on-line service. Also, Smart Cards can be used for per-usage billing. Whereas prior art game enhancers could, for example, add more lives to a character or make slight changes to a game cartridge, the enhancer 4 is able to completely change the behavior of a game cartridge, or add capability (e.g. a user interface to an on-line game matchmaking service) that has only an indirect relationship to the game. Also, the enhancer 4 is a relatively inexpensive device to manufacture.

As will be described in detail below, the architecture of the enhancer 4 is far more efficient than prior art architectures for video game enhancers. Rather than using the prior art approach of an address comparator for every word that is substituted on the video game cartridge 1 (which would run into the 10's of thousands of comparators for the amount of data in the presently preferred embodiment), there are only 16 address comparators for "patch addresses", one address comparator for a "transition address", and eight address comparators for "region" bounds (a total of 25) in the presently preferred embodiment. The ratio of words of data to address comparators in the presently preferred embodiment is over 1000 to 1, versus 1 to 1 in prior art systems.

Also, the enhancer 4, when considered as a video game modem, has a significantly broader applicability than prior art video game modems. Rather than being limited to working with video game cartridges that are written specifically to take advantage of its communication capabilities, the enhancer 4 will work with existing video game cartridges by modifying their execution so as to be compatible with the modem 24. Indeed, the enhancer 4 can make video game cartridges designed to work with other video game modems compatible with itself.

Finally, it is important to distinguish the enhancer 4 from prior art software development systems (such as the PSYQ SEGA DEVELOPMENT SYSTEM™ from PSYGNOSIS, LTD.™, an English company) that provide a means for altering the execution of a ROM using a RAM overlay. PsyQ Sega Development System and "PSYGNOSIS™" are trademarks of Psygnosis, Ltd. In order that software can be developed more easily, such development systems provide a large block of RAM that they place in the same address space where a ROM would normally reside. When an access is made to the ROM, the development system intercepts the access and enables the RAM instead. In order to alter the execution of an existing ROM, such systems must copy the contents of ROM to the RAM, alter memory locations in the RAM with the desired changes, and then execute out of the RAM. Such an approach is inherently quite costly, because a given amount of RAM is much more expensive than an equivalent amount of ROM. Usually game enhancements require only a small fraction of the ROM to be modified, so allocating so much RAM is extremely inefficient.

The enhancer 4, in contrast, does not require that any of the video contents of game cartridge 1 ROM 20 be copied into the enhancer RAM 27 in order to alter the execution of video game cartridge 1 ROM 20; the enhancer 4 only requires new software (i.e. software which does not already exist in the ROM 20) to be placed in its RAM 27. Indeed, in the presently preferred embodiment, the RAM 27 is only 64 KiloBytes (KBytes), yet it is sufficient memory to store substantial enhancements for several games simultaneously, along with other system and user profiling data. For example, in the case of using the presently preferred embodiment of enhancer 4 for enhancing video game cartridge "NBA JAM™", by "ACCLAIM, INC.™" so that it could be played across a telephone line with another user (with a second enhancer 4 and video game cartridge "NBA JAM™"), the present invention requires less than 3 KBytes without any of the data in RAM 27 being copied from ROM 20 of the NBA JAM cartridge. NBA Jam's ROM 20 is a 2 MByte ROM, and if a prior art RAM overlay approach had been used instead, a full 2 MBytes of RAM 27 would be required, more than 500 times larger than the 3 MBytes of RAM required in the presently preferred embodiment.

Description of Internal Operation of the Improved Enhancer of the Present Invention In the following descriptions, active low is denoted in signal names with a preceding slash "/". For example, active low CS is denoted /CS. When the same signal name is used both with and without the preceding slash, the implication is there is an inverter (not shown) that produces the logical NOT of the original signal.

Overview of the Internal System Architecture

Figure 2:
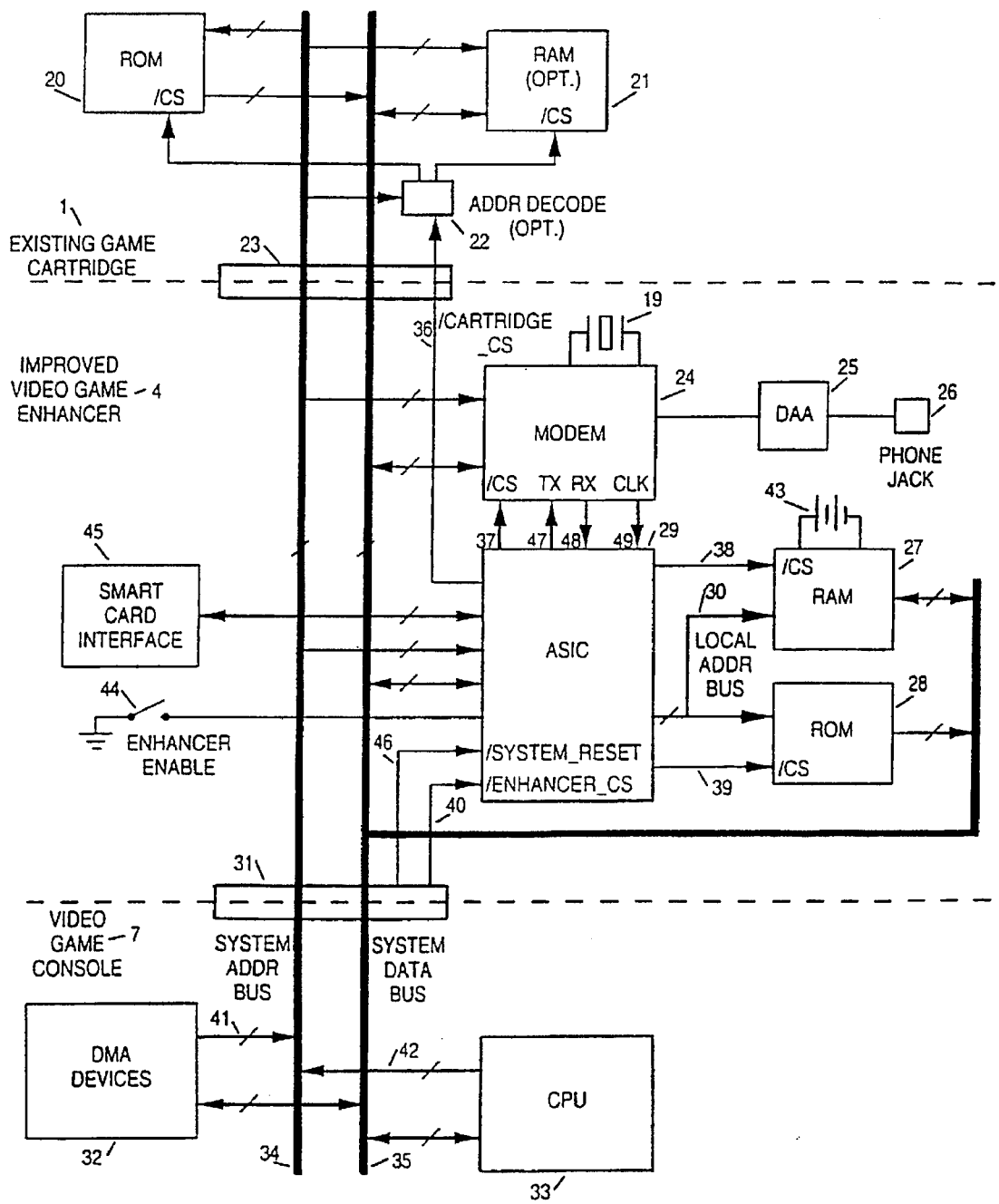
FIG. 2 is a block diagram of the architecture of the preferred embodiment.

FIG. 2 is a block diagram of the improved enhancer (4 from FIG. 1) in the center of the figure, shown attached to a video game console (7 from FIG. 1) via interface 31 at the bottom and an existing game cartridge (1 from FIG. 1) via interface 23 at the top. There are a number of other signals and subsystems that are not shown in this diagram; but, all of those relevant to the operation of the presently preferred embodiment are shown.

The System Address Bus 34 and the System Data Bus 35 pass through edge connector 31 into the enhancer 4, which passes them through to its top edge connector 23 to the game cartridge 1. The address bus is driven either by video game CPU 33 or, through the use of well-known Direct Memory Access (DMA) methods, by at least one DMA Device 32. The CPU is a MC68HC000 (manufactured by "MOTOROLA, INC.™" and others) for the Sega Genesis or a W65C816 (manufactured by "NINTENDO INC.™" and others) for the "SUPER NINTENDO ENTERTAINMENT SYSTEM™" in the presently preferred embodiment. The System Address Bus 34 is 24 bits wide and the System Data Bus 35 is 8 or 16 bits wide in the presently preferred embodiment. Logic (not shown) within the video game console 7 asserts a/chip_select (/CS) signal 40, whenever there is an access from either a DMA Device 32 or CPU 33 within the address space of the video game cartridge 1. Also, upon the user pressing the Reset button or upon powerup, /system_reset 46 is asserted. Note that in almost all cases the presently preferred embodiment as described herein applies to enhancer 4 versions for both the "SEGA GENESIS™" and SUPER NINTENDO ENTERTAINMENT SYSTEM. Where there is divergence between the two systems, the description herein refers to a preferred embodiment for the Sega Genesis system.

The enhancer Application Specific Integrated Circuit (ASIC) 29 provides all of the control and bus management logic for the enhancer 4. The ASIC 29 connects to the full Address Bus 34 and to 8 bits of the Data Bus 35. /CS 40 is connected to the ASIC 29 (to generate internal signal enhancer_cs), and /system_reset 46 is also connected to the ASIC to generate internal signal system_reset. An Enhancer Enable SPST switch 44 (corresponding to FIG. 1 switch 14) is connected to the ASIC 29 with an internal pull-up resistor to generate internal signal enhancer_enable. The ASIC 29 is connected to Smart Card interface 45, which consists of contact fingers and a slot (corresponding to slot 16 of FIG. 1). The contact fingers are connected to internal signals smart_card_tx, smart_card_rx, and smart_card_clk. These are well known interface signals for a Smart Card. The ASIC 29 generates Chip Select signals 36, 37, 38 and 39, corresponding to internal signals cartridge_cs, modem_cs, RAM_cs, and ROM_cs, respectively. The ASIC 29 drives Local Address Bus 30 to RAM 27 and ROM 28. In the presently preferred embodiment Local Address Bus 30 is 24 bits wide.

In the presently preferred embodiment, RAM 27 is 64 KBytes of battery backed up Static RAM, implemented as two 8-bit wide 32 KByte SRAM chips. A lithium-ion battery 43 is provided that will retain the SRAM for at least 10 years (more than the expected lifetime of the product). The RAM 27 attaches to the full width of the System Data Bus 35. Conventional flash EPROM can also be used to provide a non-volatile memory store. Volatile RAM, such as DRAM or SRAM without battery backup, can also be used; but, the volatile memory would retain data only so long as the video game console 7 was turned on, and would thus be less convenient. The ROM 28 is 256 KBytes of mask ROM. The RAM 28 attaches to the full width of the System Data Bus 35.

The modem 24 is a 2400 bps V.22bis modem chip in the presently preferred embodiment. Higher speed modems would be preferable in certain respects; but, 2400 bps is inexpensive (since it is a ten year old technology) and adequate for the real-time requirements (e.g., it has a relatively low modulation/demodulation latency) of playing video games over a telephone line. The modem 24 interfaces to 8 bits of the System Data Bus 35 for access to its control registers, and its control registers are enabled for read and write by /CS 37 corresponding to internal ASIC signal modem_cs. Data to be transmitted or received is communicated serially from the ASIC 29 on TX 47 for transmit, RX 48 for receive, and both signals are clocked by CLK 49, a bit-synchronous clock generated by the modem 24. These signals correspond to ASIC 29 internal signals modem_tx, modem_rx, and modem_clk, respectively. The modem 24 has a crystal 19 from which it derives its internal clocks. The analog input/output of modem 24 is coupled to Data Access Arrangement (DAA) 25 to be coupled to phone jack 26 (corresponding to phone jack 11 in FIG. 1) for connection to a telephone outlet.

At the top of FIG. 2 is a block diagram of a video game cartridge 1. Most video game cartridges have only a ROM 20 coupled to the System Address Bus 34 and all bits of the System Data Bus 35 and ROM 20 derives its Chip Select directly from /cartridge_cs 36 (corresponding to ASIC 29 internal signal cartridge_cs). Cartridges optionally also have a RAM 21, which is sometimes battery backed up or based on a non-volatile technology, and is used for recording high scores, etc. If a RAM 21 is provided in the cartridge, an address decoder 22 is often used to select between the ROM 20 and the RAM 21. Additionally, in the case of Super Nintendo Entertainment System cartridges, there is a security chip (not shown) that prevents unauthorized cartridges from being used with the video game. Finally, there are some cartridges (not shown) that have processing elements (e.g. for 3D graphics) as well as on-board RAM. One such cartridge is "VIRTUA RACER™" from "SEGA™." Virtua Racer is a trademark of Sega, Inc.

Memory Map

Figure 4:
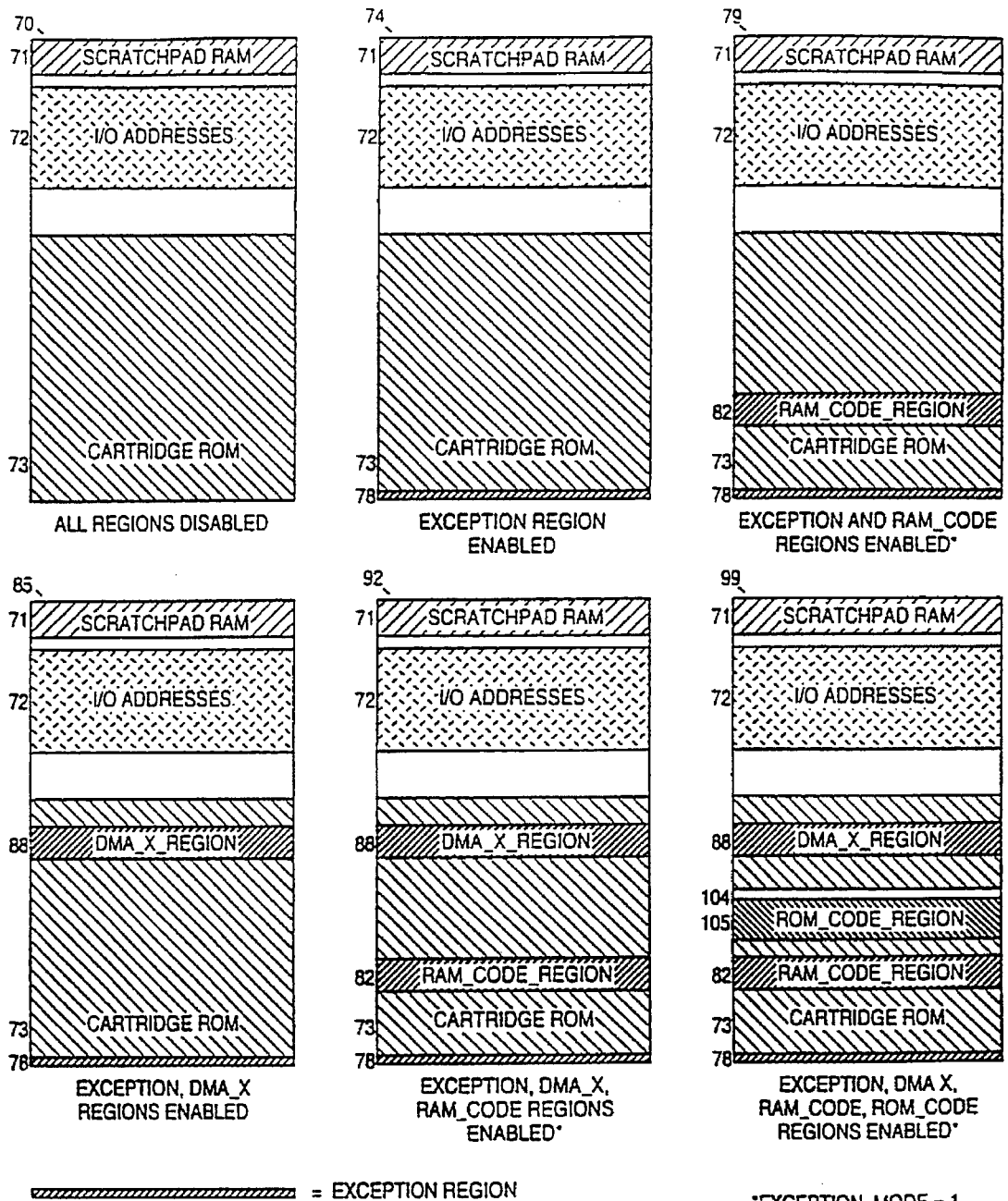
FIG. 4 illustrates the system address map with the video game cartridge enabled.

The following descriptions are based on a simplified video game memory map that is shown in memory map 70 of FIG. 4. Both the Sega Genesis and Super Nintendo video game systems—and others—have memory maps that are considerably more complex (and convoluted) than the ones shown here. However, this map is sufficient to explain the operation of the presently preferred embodiment without unnecessary complication from details irrelevant to its operation.

As shown in FIG. 4, the top area, regions 71 and 72 of memory map 70 designate addresses internal to the video game console 7. CPU 33 or DMA 32 accesses to these regions are not presented to the enhancer 4 (i.e. the /enhancer_cs 40 signal is not asserted) and have no bearing on the operation of the enhancer 4 or the video game cartridge 1.

The bottom area 73 of map 70 corresponds to the complete addressable memory map to what would normally be the cartridge 1 ROM 20. Each access by CPU 33 or DMA 32 within this area results in an assertion of /enhancer_cs 40. As explained previously, the designation "Cartridge ROM" is a slight misnomer since some cartridges also have RAM and possibly processing elements that are accessed in this memory space. Nonetheless, a cartridge memory space that is completely filled by a ROM 20 presents a worst-case scenario for the enhancer 4 and is a useful simplification to understand its operation, and as such we shall designate the full cartridge memory map as "Cartridge ROM" in this specification. Consequently, in the descriptions that follow, accesses to the cartridge 1 will be described as accesses to the ROM 20, even though in practice they might be accesses to a RAM 21 or another device in the cartridge. Note that the presently preferred embodiment of enhancer 4 does work correctly with both cartridges containing RAM 21 and ones containing processing elements.

Theory of Operation

Figure 18:
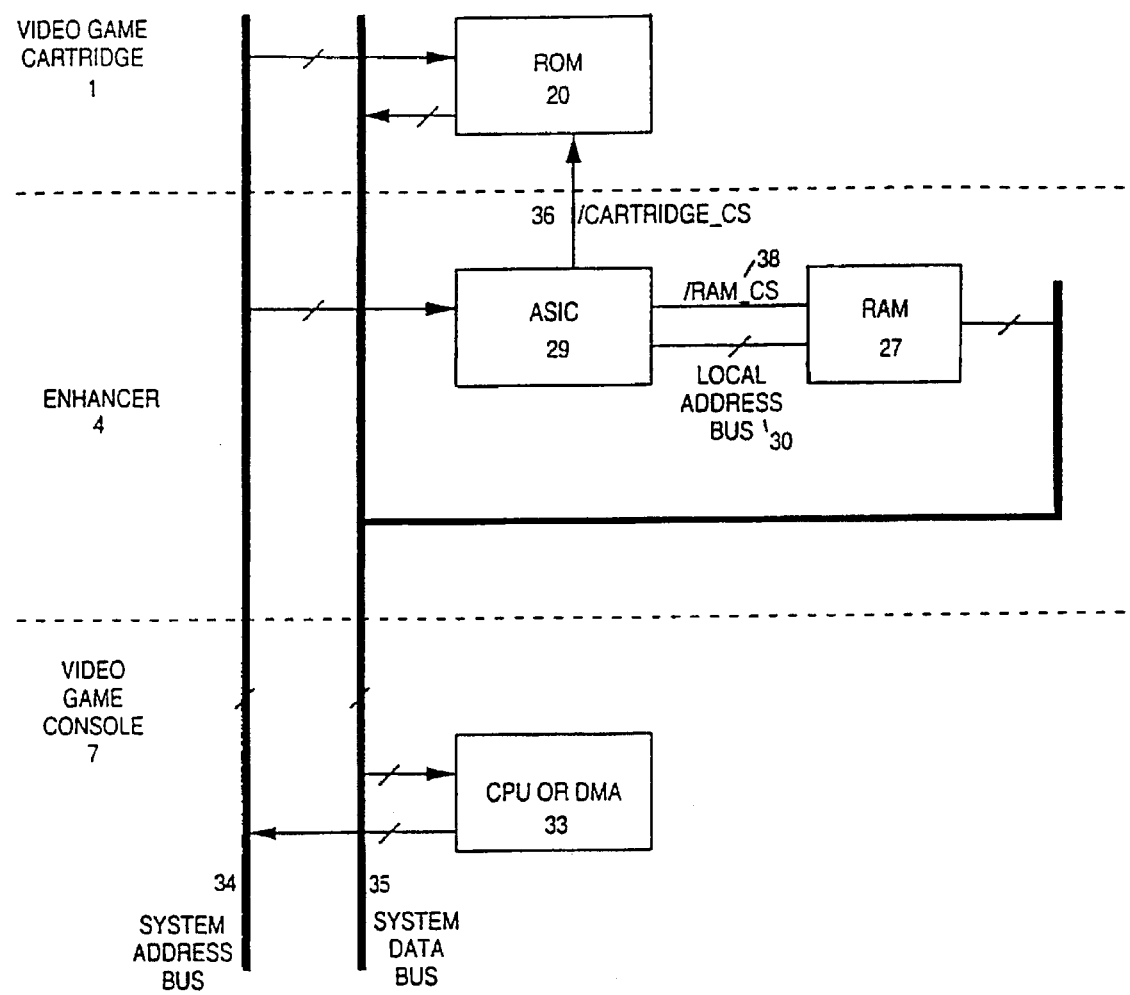
FIGS. 18–21 illustrate examples of accessing locations in cartridge ROM and processing these accesses by the present invention.

When in operation, the enhancer 4 normally permits accesses to the cartridge ROM region 73 to pass through the enhancer 4 to the cartridge 1 and access the ROM 20 (by enabling /cartridge_cs 36). This is illustrated in FIG. 18. Referring to FIG. 18, the CPU 33 generates a read access to within the Cartridge ROM region 73. The ASIC 29 determines this read address should be responded to normally by the video game cartridge 1 ROM 20, and asserts /cartridge_cs 36. The ROM 20 receives the address on System Address Bus 34, and is activated by the /cartridge_cs 36, and responds by presenting the addressed data on System Data Bus 35.

Figure 19:
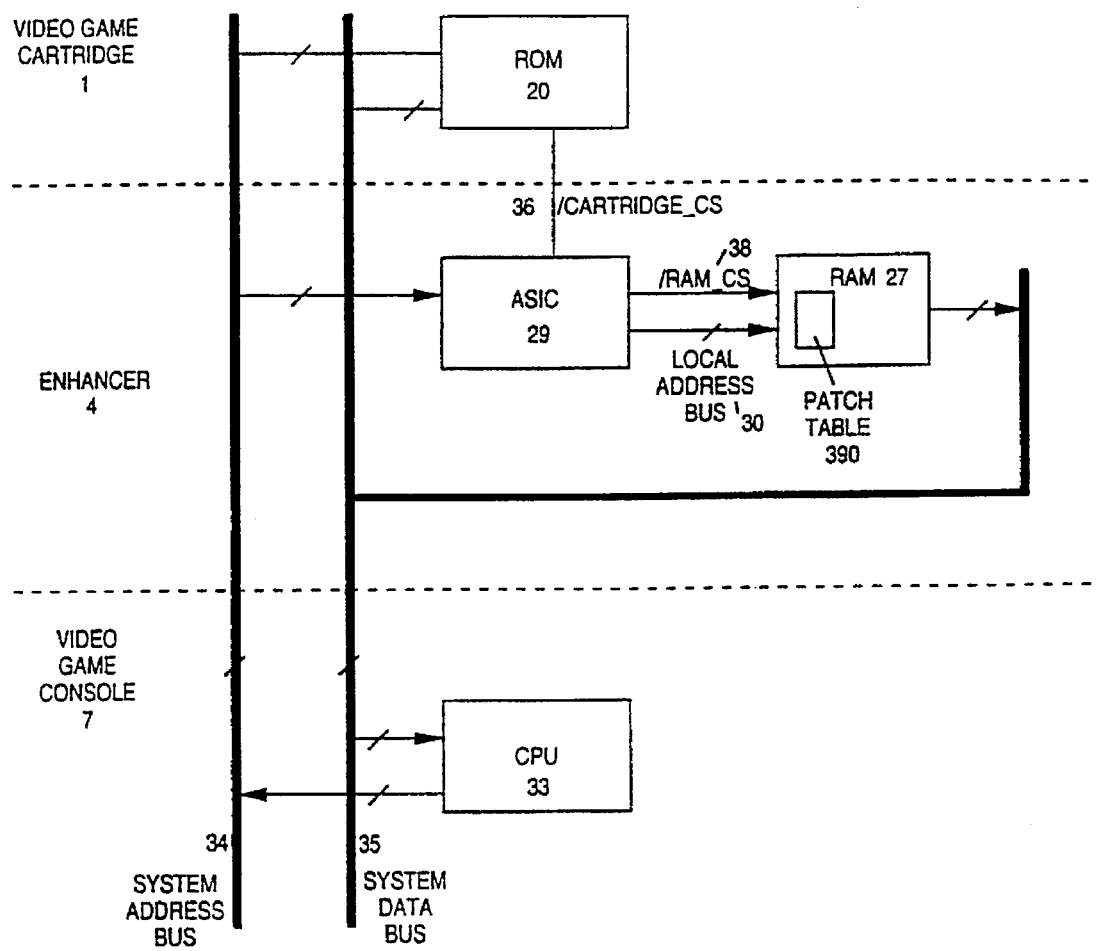

However, the ASIC 29 may be programmed with 16 numbered "patch addresses." When the CPU 33 generates a read to one of these patch addresses, the ASIC 29 detects the condition and presents the patch number, offset by a patch table base address, on Local Address Bus 30 to RAM 27 and asserts /RAM_CS 38. The RAM 27 responds by presenting the data from a patch table corresponding to the patch number on System Data Bus 35 to be read by the CPU 33. This transaction is illustrated in FIG. 19. Referring to FIG. 19, the patch table 390 is 16 entries long in the preferred embodiment, each corresponding to one of the patch addresses. For example if patch address #13 is programmed to be $1D435A ($ denotes hexadecimal), then a read by CPU 33 from $1D435A will fetch entry #13 from patch table 390 in RAM 27.

The patch table 390 can, in principle, be loaded with any data at all, but it in the most general application of the presently preferred embodiment, each patch table entry contains a conventional trap instruction that, when fetched by the CPU 33, causes an exception and forces the CPU 33 to jump to a trap handler. An example of such a trap instruction is $F020 in the "MOTOROLA™" 68000 instruction set.

Figure 20:
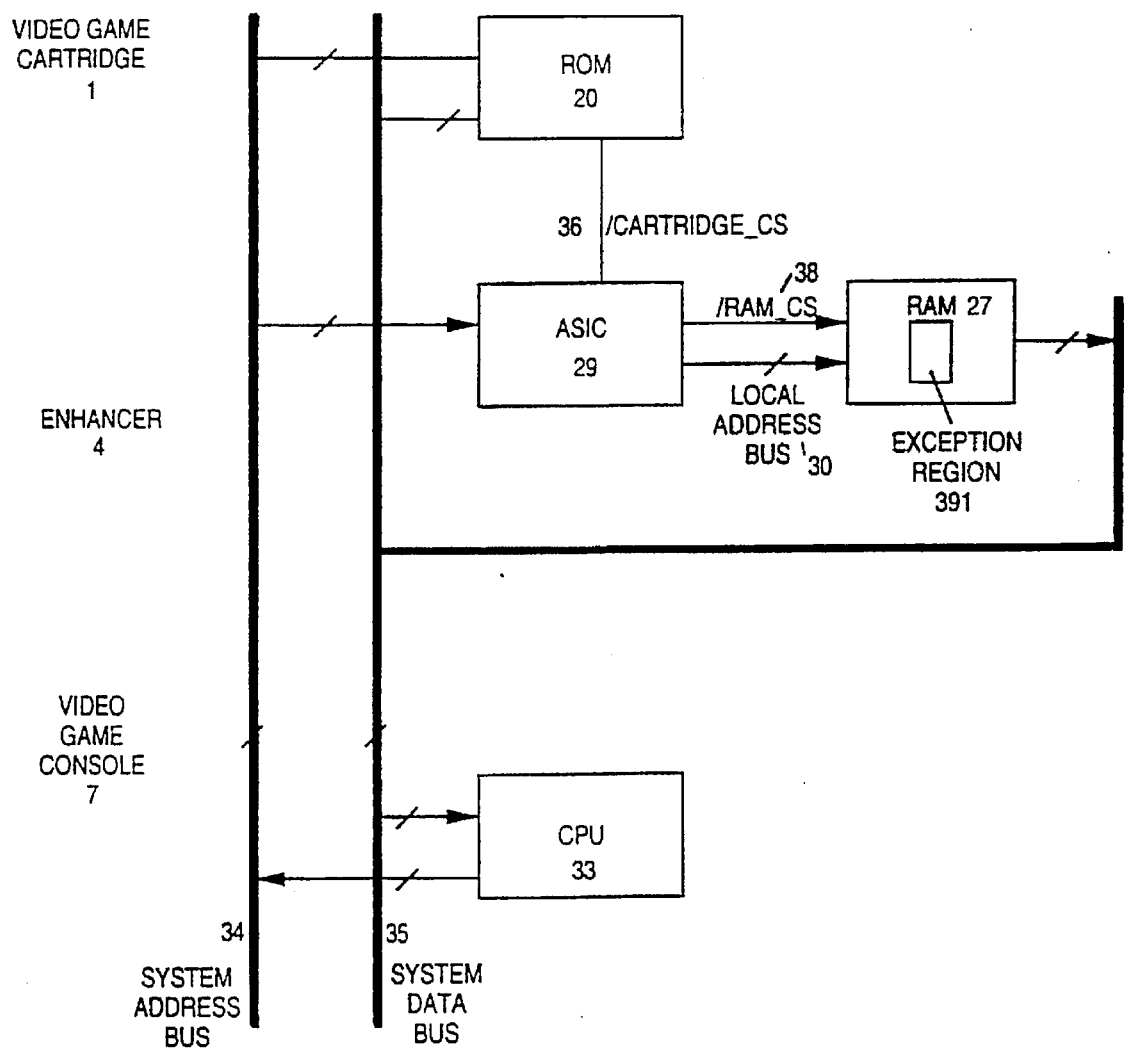

The specific and well known manner in which the CPU 33 handles the trap exception is to fetch the trap's exception vector from the exception region 78 (of FIG. 4) of its address space. The exception region 78, in the address space of the CPU 33, is shown in the present preferred embodiment in memory map 74 of FIG. 4. (In the case of the 68000, this exception region is located in the lowest 256 bytes of its address space, $000000 thru $0000FF.) In the presently preferred embodiment, the ASIC 29 maps this exception region to the RAM 27, rather than to the ROM 20 where it would be mapped if the enhancer 4 were not installed. Consequently, when the CPU 33 fetches its trap exception vector, it fetches an exception vector previously stored in the exception region 391 in RAM 27, as illustrated in FIG. 20. CPU 33 then jumps to the address contained in the vector. Note that FIG. 4 shows the exception region 78 from the perspective of CPU 33. FIG. 20 shows that the same exception region 391 is physically stored in RAM 27.

Figure 21:
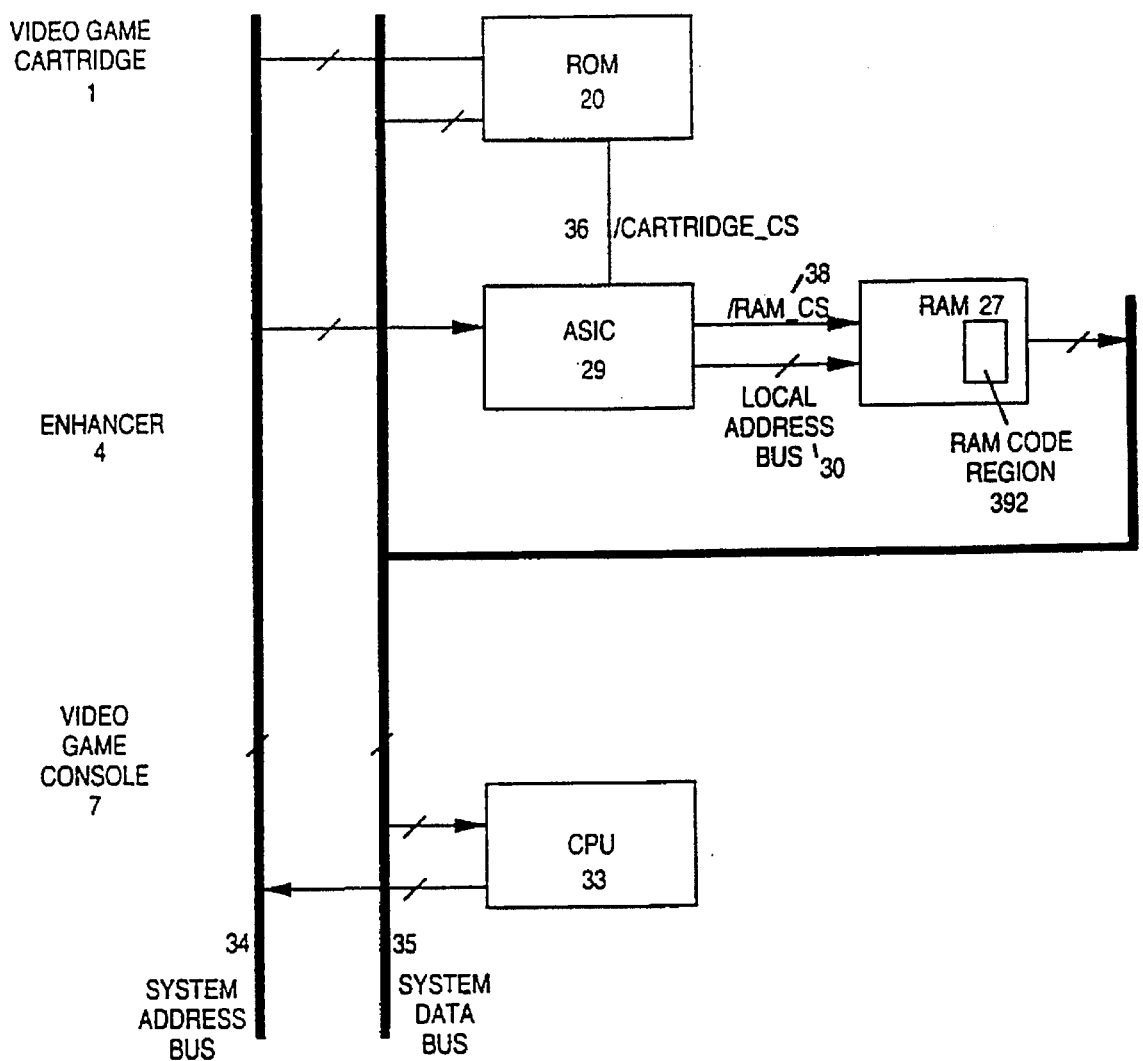

The access by CPU 33 to the exception region has a side-effect: it causes the ASIC 29 to transition into a different mode of operation, called exception mode. While in exception mode the ASIC 29 maps in another region of RAM 27, the RAM code region 392 as illustrated in FIG. 21 and region 82 shown in memory map 79 of FIG. 4. The RAM code region 392 is defined by a RAM_code_start address and a RAM_code_end address in the address space of CPU 33. While in exception mode, any access by the CPU 33 between these two addresses is directed to the RAM code region 392 (of FIG. 21) of RAM 27 rather than to the ROM 20. In the presently preferred embodiment, the trap exception handler is normally placed in the RAM code region 392, so the trap exception vector fetched by the CPU 33 will direct it to the trap exception handler. The next fetch by the CPU 33 will be the first instruction of the trap exception handler in the RAM code region 392. Note that FIG. 4 shows the RAM code region 82 from the perspective of the CPU 33. FIG. 21 shows that the same RAM code region 392 is physically stored in RAM 27.

The trap exception handler can then direct the CPU 33 in whatever manner is appropriate for handling the patch that caused the trap. In the case of the 68000, there are many different trap numbers, so if desired, each individual patch address can have a unique trap number (e.g. $F000, $F001, $F002, for patch address numbers 0, 1, and 2, respectively) in patch table 390, resulting in immediate identification of the patch number in the trap handler. Additionally, as the consequence of the normal handling of a trap by CPU 33, the address of the instruction following the trap (i.e. one instruction word beyond the patch address) is available on the system stack, so this can also be used to identify which patch caused the trap.

The ASIC 29 will remain in emulation mode as long as needed. Memory accesses by the CPU 33 within the RAM code region 82 will continue to be directed to the RAM 27 and accesses outside of that region (except for other regions mapped by the ASIC 29, as will be explained shortly) will be directed to the ROM 20. Thus, an arbitrarily long patch can be written in the RAM 27 with execution that begins when the CPU 33 reaches a particular patch address when normally accessed in the ROM 20.

The ASIC 29 exists emulation mode upon access to a particular predetermined address (called the transition address). The patch handler is written so that when it is about to complete, it programs the transition address to be the address of the last instruction of the patch. Normally, this last instruction is a conventional ReTurn from Exception (RTE) instruction (RTF is the 68000 processor mnemenic) in the RAM code region 82. When the CPU 33 fetches the RTE instruction, it returns to its execution state from prior to the trap exception, and the ASIC 29 transitions out of emulation mode (although not always as will be explained. The RAM code region 82 thereby disappears from the memory map until emulation mode is entered again. Generally, the next memory access the CPU 33 makes is back in the ROM 20 at the address following the address of the trap instruction.

Thus, in summary, the basic patching operation has been described that allows the CPU 33 to hit a patch address, and then execute a long code sequence of instructions in RAM code region 82 of the RAM 27 before returning to the ROM 20 again. Since the RAM code region 82 is only visible in the memory map in exception mode, virtually all of the Cartridge ROM region 73 is available for the execution of game code in the video game cartridge 1. Indeed, addresses used by the CPU 33 in the RAM code region 82 normally do overlap addresses used by the CPU 33 when accessing the ROM 20; the only limitation to full utilization of the ROM 20 address space is that when in exception mode, the ROM 20 cannot be accessed in the address region occupied by the RAM code region 82. When not in exception mode, almost all of the useable area of the Cartridge ROM region 73 is available for access by the CPU 33, even if some ROM 20 addresses overlap those of RAM code region 82 addresses. Thus, the enhancer 4 effectively extends the Cartridge ROM region 73 to allow full utilization of the ROM 20.

Access to Enhancer ROM and Control Registers

Sometimes it is desirable to have access to the enhancer ROM 28 (FIG. 2) during execution to have access to, for example, operating system software. To accommodate this requirement, a ROM code region 105 (FIG. 4) that, like the RAM code region 82, is only mapped during exception mode (if it is enabled) in the presently preferred embodiment as shown in memory map 99. Also, the basic region enabling control registers for the ASIC 29 are mapped, in the presently preferred embodiment, in some unused space at the top of the exception region 78. In this way it is possible for the CPU 33 to implement the basic enable and disable of regions in any memory map configuration, except when the exception region 78 is disabled (as shown in memory map 70). However, there are too many registers in ASIC 29 and modem 24 to conveniently keep all of them always mapped. Thus, the full set of control registers for the ASIC 29 as well as the control registers for the modem 24 are mapped into the top 256 bytes of the ROM code region 105 in a control register region 104. So, to access the full set of the enhancer 4's control registers, the ROM code region 105 must be mapped in as shown in memory map 99.

The detailed operation of the enhancer 4 is a bit more complex than the basic theory of operation just described. This is due to the issue of simultaneous DMA access while the CPU 33 is executing and other subtleties in the case of multiple exceptions. These issues are addressed in the following sections.

DMA Issues

A principal difficulty with the approach just described is that the DMA devices 32 (FIG. 2) access into the same address space as the CPU 33, and there is no way to distinguish between a DMA access and a CPU access. Thus, there a number of potential hazards.

1. If a DMA device 32 fetches a patch address, the ASIC 29 will cause a trap instruction to be fetched rather than the desired data. Although it is possible for this hazard to occur, it always can be avoided by pre-determining in which memory regions the cartridge 1 will perform DMA and making sure there are no patches in these memory regions. It is unlikely that there would be a need to place a patch address in a DMA region since DMA is primarily used for graphics and sound data, not instruction code. Due to this situation, this hazard does not come up in practice.

2. If a DMA device 32 fetches data during exception mode when the RAM code region 82 or ROM code region 105 (FIG. 4) is mapped in, it will fetch data from the RAM code region 82 or ROM code region 105 rather than from the ROM 20 as intended. As in paragraph 1, above, this hazard can be avoided by pre-determining in which memory regions the cartridge 1 will perform DMA and making sure the RAM code region 82 and ROM code region 105 do not overlap these memory regions. There is always plenty of space in a game cartridge which is free of DMA accesses, since DMA is primarily used for graphics and sound data, not instruction code, and there must be a certain amount of code to make a video game useful. Due to this situation, this hazard does not come up in practice.

3. If a DMA device 32 fetches data in the exception region 78, it will trigger exception mode and map in the RAM code region 82. Normally, there is no reason for a cartridge 1 to perform DMA in the exception region 78 since, a) the DMA is normally used for graphics and sound data, b) the exception region 78 only contains vectors which normally are unchanged during program execution, and c) the exception vectors constitute such a small amount of sparse data, there is very little point in using DMA to move them. Given these reasons, it is unlikely that DMA would be used to fetch data in the exception region 82. If, however, some game programmer decides to use DMA to fetch data from the exception region (e.g. to deliberately attempt to defeat the proper function of the enhancer 4), the DMA access will simply have the effect of activating exception mode and mapping in the RAM code region 82 upon every DMA access. This can be addressed in two ways: a) patch out and replace the said hacker software in the cartridge 1 responsible for the DMA fetch from exception region 78 with code that performs the same operation without using DMA (using the patching methods described previously), or b) find a place in the cartridge ROM region 73 where the RAM code region 82 can be mapped in constantly (this is usually not a problem since most game cartridges are smaller than the full cartridge ROM region 73).

4. If there is an error in the cartridge 1 software that spuriously reads from the exception region 78, the ASIC 29 will go into exception mode and map in the RAM code region 82. Such errors are actually not unusual: frequently, uninitialized pointers point to address 0 and software spuriously reads the address pointed to by the unitialized pointer ($0), but doesn't use the data which was read. This doesn't affect the execution of the game, so it is never corrected. In the case of the 68000 processor, address 0 is the first word in the exception region 78. As with the DMA to the exception region, the best solution is to identify the source of the spurious read (easily accomplished by attaching a logic analyzer to the video game), and patch around it. If this cannot be accomplished, then a place must be found where the RAM code region 82 can be mapped in constantly.

Thus, with judicious placement of patch addresses and the RAM code region 82, it is possible to avoid conflicts with DMA accesses to the cartridge ROM region 73. However, it is sometimes the case that, rather than avoiding conflicts with DMA accesses, it is desirable to patch regions of the cartridge 1 ROM 20 that are used by DMA (e.g. to replace sound or graphics data). The presently preferred embodiment provides two regions to accommodate this requirement: the DMA X region and the DMA Y region.

Since it is not possible to predict when DMA devices 32 (from FIG. 2) will access the cartridge ROM region 73 (from FIG. 4), the DMA X and Y regions must be mapped at all times that DMA might occur. In FIG. 4 memory map 85 shows DMA X region 88 mapped into the address space of CPU 33. Any access to DMA X region 88 by the CPU 33 will be mapped to the RAM 27 (using the same remapping mechanism described in regard to RAM code region 82). DMA X region 88 remains mapped during normal execution, as shown in memory map 85, and during exception mode, as shown in memory map 92, so while enabled, the DMA X region effectively replaces the region of cartridge ROM region 73 that it overlaps. Note the DMA Y region (not shown) operates in exactly the same manner, overlapping a different area of the cartridge ROM region 73 simultaneously with the DMA X region.

Normal Exceptions

Note that a normal exception (i.e. other than a patch-caused exception, such as an interrupt or error exception) will cause the CPU 33 to access a vector in exception region 78 and thereby cause ASIC 29 to enter into exception mode and map in RAM code region 82. It is often the case that it is desirable to patch the handler for a normal exception, and thus it is usually convenient that exception mode is entered during normal exceptions. The exception vector (in the exception region 78) of the normal exception is preloaded with the entry address of an exception handler in RAM code region 82. The exception handler may, a) take care of the normal exception entirely (returning to the main line code execution with an RTE at the end of the exception handler), b) implement some code to precede cartridge 1's normal exception handler, and then jump to the cartridge 1's normal exception handler, c) preload the stack so as to return to code in the RAM code region 82 that will follow the execution of cartridge 1's normal exception handler, or d) jump immediately to the cartridge 1's normal exception handler. Thus, with a normal exception we have the option of replacing, making a patch prior to, making a patch after, or not making any patch to cartridge 1's normal exception handler.

Multiple Exceptions

It is often the case that the CPU 33 must respond to an exception while another exception is in progress. This is particularly the case with trap exceptions since they often run in the mainline code stream without interrupts disabled.

Consider, for example, the case when the CPU 33 is executing in exception mode (in RAM code region 82) due to a trap initiated by hitting a patch address, interrupts are enabled, and an interrupt occurs. The CPU 33 will suspend its execution, save its status register and program counter on the system stack, and fetch an exception vector from the exception page 78. Since the ASIC 29 is already in exception mode, it doesn't have to change its state. The CPU 33 will then begin execution at the address of the patched part of the interrupt exception handler in RAM code region 82. Upon reaching the end of the patched part of the interrupt exception handler, the transition address register in ASIC 29 will be loaded with the address of the RTE instruction. Given the previously discussed methods of exiting exception mode, one would think that upon executing the RTE, the fetch at the transition address will cause ASIC 29 to leave exception mode. Of course, this would have disastrous results since the code that was suspended by the interrupt exception was in the RAM code region 82, which is only mapped during exception mode. Clearly, the simple switch-on-upon-entry switch-off-upon-exit method of handling exception mode is not sufficient for multiple exceptions.

Figure 11:
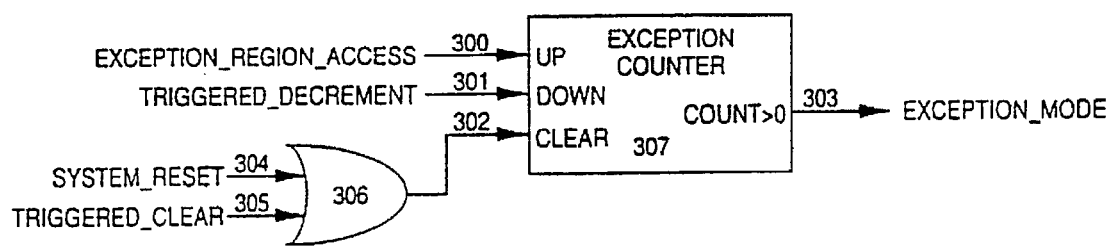
FIG. 11 illustrates the exception counter logic of the preferred embodiment.

To address this problem the ASIC 29 has an exception counter 307 shown in FIG. 11. Exception mode is active whenever the exception counter 307 is not equal to 0. Upon an access to the exception region 78 the exception counter 307 is incremented by 1, upon the CPU 33 accessing the transition address (when it is enabled) the exception counter 307 is decremented by 1. Thus, in the example above, the trap exception would increment the exception counter 307 by 1 to 1, the interrupt exception would increment it again by 1 to 2, and then upon exiting the interrupt exception, the access to the transition address would decrement the exception counter 307 by 1 back to 1. In this way, when execution is resumed after the interrupt is handled, the ASIC 29 will still be in exception mode and the RAM code region 82 will still be mapped.

The exception counter 307 must have enough bits of count to handle the most deeply nested number of exceptions that can be encountered (or more precisely, as many as are allowed, since traps can be nested indefinitely) in the course of execution. In the presently preferred embodiment, it has 3 bits of count, for up to 7 levels of exception nesting.

Also, there are times when software will want to override the normal increment/decrement exception counter 307 mechanism. Thus, by writing to a control register and loading the transition counter appropriately, the exception counter 307 can be forced to either decrement or be cleared. (It can be easily incremented by reading a word from the exception region 78.)

Memory Maps

Figure 3:
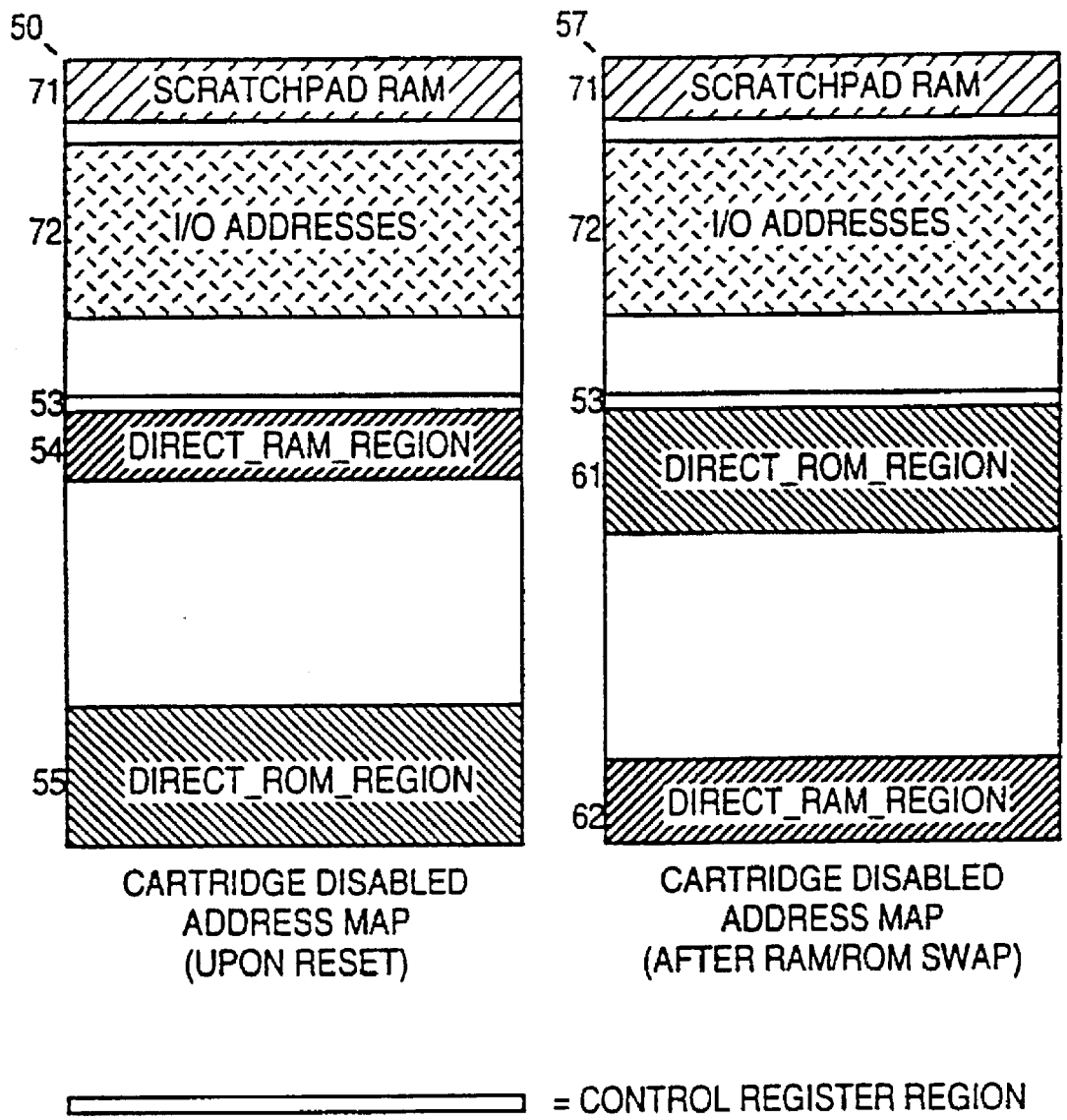
FIG. 3 illustrates the system address map with the video game cartridge disabled.

When the video game is powered on or reset, the ASIC 29 initializes into a cartridge disabled mode with all of the RAM 27 and all of the ROM 28 as well as all of the ASIC 29 and modem 24 control registers mapped into the CPU 33 address space, with the cartridge 1 disabled. This configuration is shown in FIG. 3, memory mode 50.

At powerup or reset, the entirety of ROM 28 is mapped into lower memory (direct ROM region 55) so that it overlaps the exception region of the CPU 33 and therefore provides the exception vectors (including the reset vector) in case the RAM 27 is not yet initialized. The entirety of RAM 27 is mapped into direct RAM region 54. Once the operating system in the direct ROM region 55 has started up after reset and the soon-to-be exception region of the RAM 27 has been initialized, the CPU 33 sets the RAM/ROM_SWAP bit of address map control register 310 (FIG. 12) in the ASIC 29 and causes the direct RAM region 54 and direct ROM region 55 address maps to be swapped so as to reflect the memory map shown in memory map 57. Now that the direct RAM region 62 is overlapping the exception region, the exception vectors can be updated as desired throughout the course of execution.

Note that while the memory map is configured as shown in memory maps 50 and 57, the cartridge ROM 20 is not accessible. To make it accessible, the enable_cartridge bit of the transition control register 314 (FIG. 12) must be enabled. There are a number of issues surrounding enabling the cartridge ROM 20. When it is enabled, the direct RAM region 62 and direct ROM region 61 will disappear. If the intention is to relinquish control of the video game system to the cartridge 1 ROM 20 until the next reset or powerup, then this will be accomplished by completely eliminating RAM 27 and ROM 28 from the address map. If the intention is to use the enhancer 4 to affect the behavior of the cartridge 1 ROM 20, then some of the other memory regions need to be enabled before the cartridge is enabled.

Figure 13:
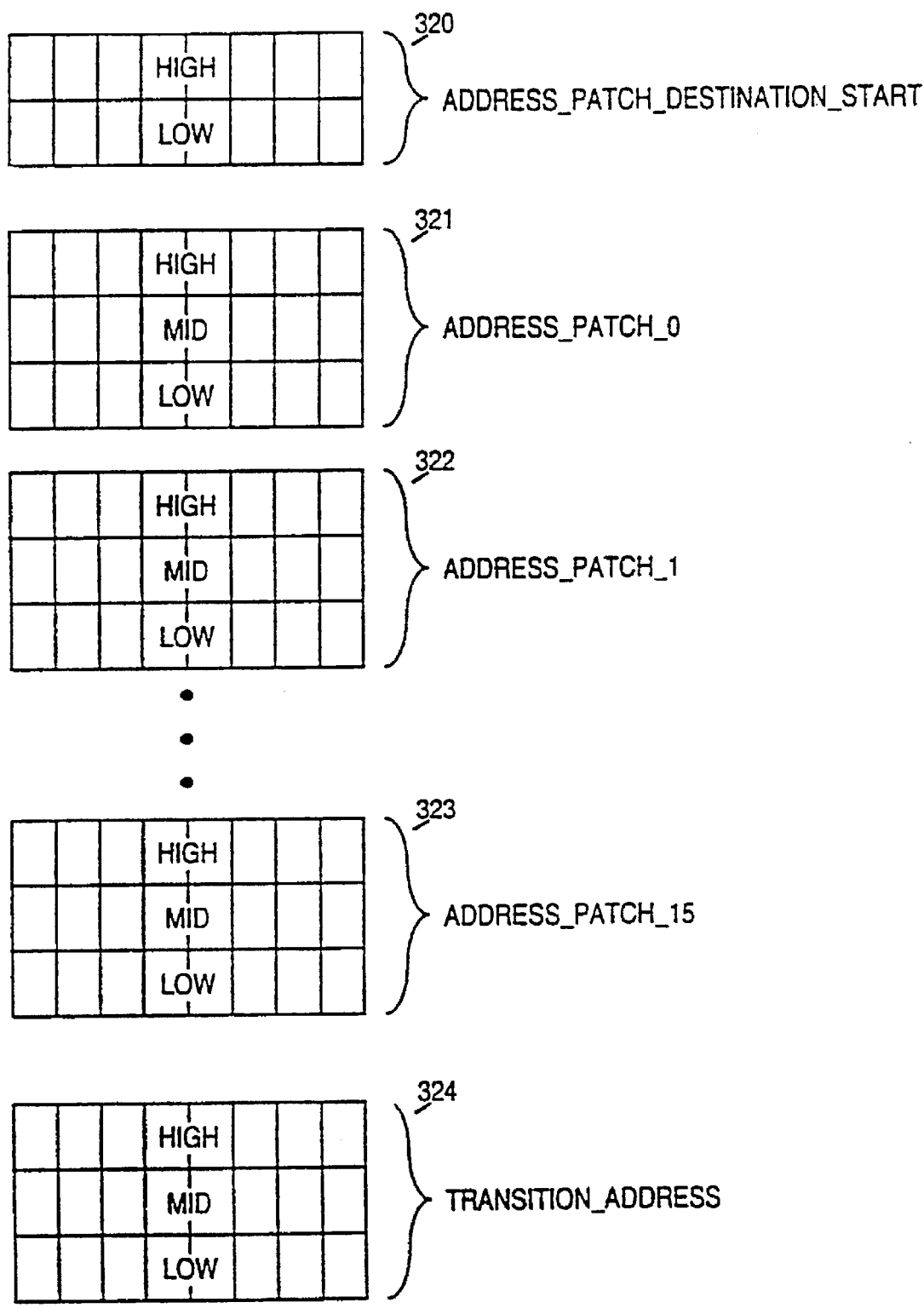
FIGS. 13–15 illustrate the other control registers of the preferred embodiment.

Another issue with enabling the cartridge 1 is making certain that the transition occurs at exactly the right moment in the program execution. This is accomplished by having the enable_cartridge control bit of control register 314 simply enable the transition address comparator 272 (FIG. 10), such that the cartridge 1 will be enabled when the CPU 33 accesses the transition address stored in transition address register 324 (FIG. 13). Thus, if the CPU 33 does any prefetching of instructions, the instruction pipeline will be filled with the correct sequence of instructions, even across the sudden switch of address space that will occur when the cartridge 1 is enabled.

The regions that can be enabled when the cartridge 1 is enabled are listed in Table 311 of FIG. 12 and are enabled by setting the appropriate bits in the address map control register 310. Of the 7 control bits shown, only the RAM/ROM_swap bit affects the address map when the cartridge 1 is disabled. The other control bits take effect upon enabling cartridge 1.

FIG. 4 shows various possible memory maps with the cartridge 1 enabled. Memory map 70 shows the memory map if no regions are enabled; in this situation the cartridge 1 will run unmodified and the enhancer 4 will remain idle until reset or powerup.

Memory map 74 shows the memory map with the exception region 78 enabled and the DMA X and DMA Y regions disabled. The ASIC 29 is not in exception mode. It is possible that the RAM code region 82 and/or ROM code region 105 are enabled, but since the ASIC 29 is not in exception mode, they are not visible. The exception region 78 is always mapped to the exception region in the CPU 33 address space and is always mapped to a corresponding direct mapped region in the RAM 27.

Figure 15:
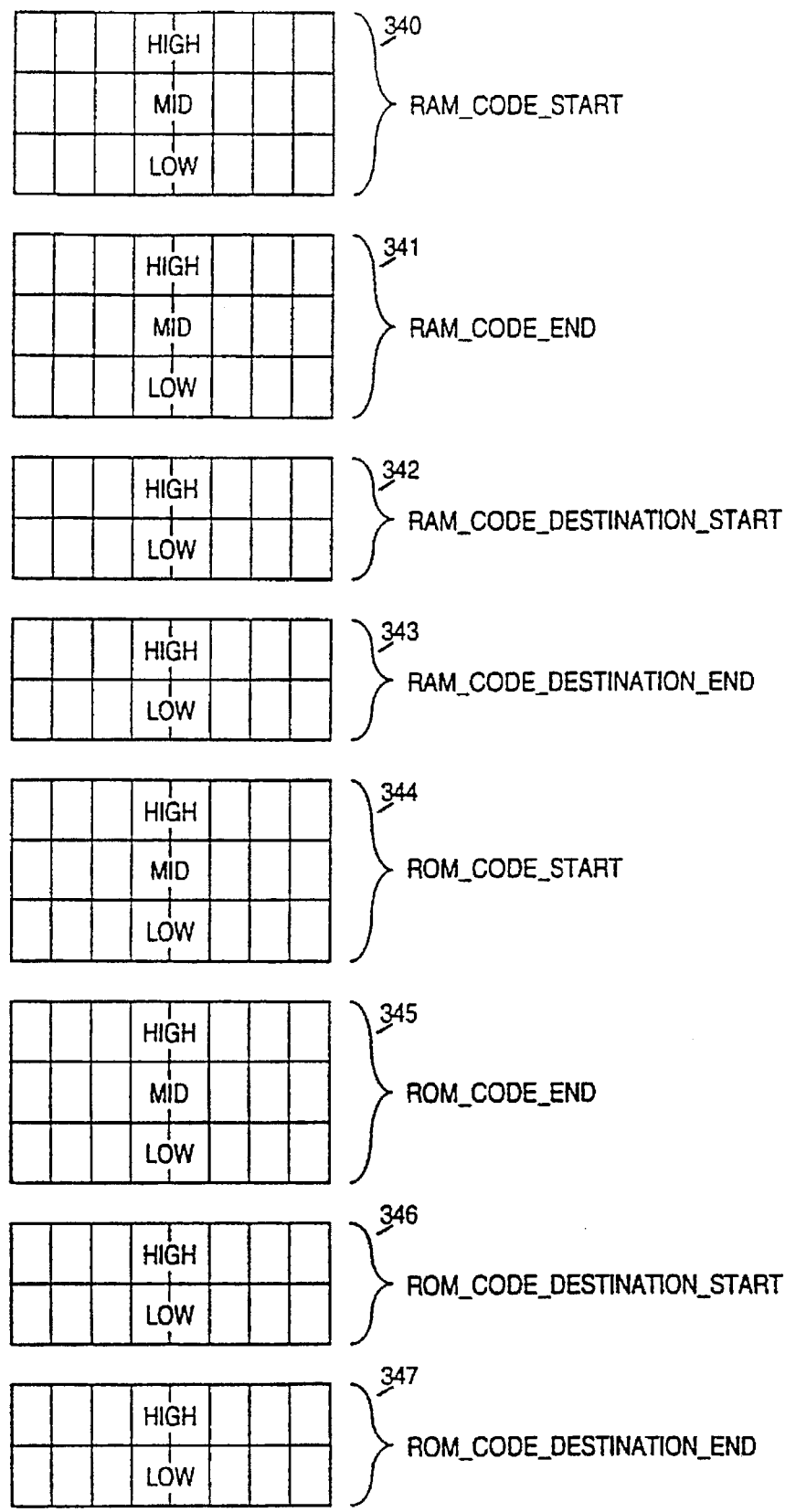

Memory map 79 shows the memory map in exception mode with the RAM code region enabled. The RAM code region 82 can start from any address and end at any address in the CPU 33 address space. The start and end is specified in the RAM_code_start register 340 and RAM_code_end register 340, respectively (FIG. 15). The region can be mapped to any region in the RAM 27, so long as the address alignment is modulus 256. This region is defined by registers RAM_code_destination_start 342 and RAM_code_destination_end 343.

Figure 14:
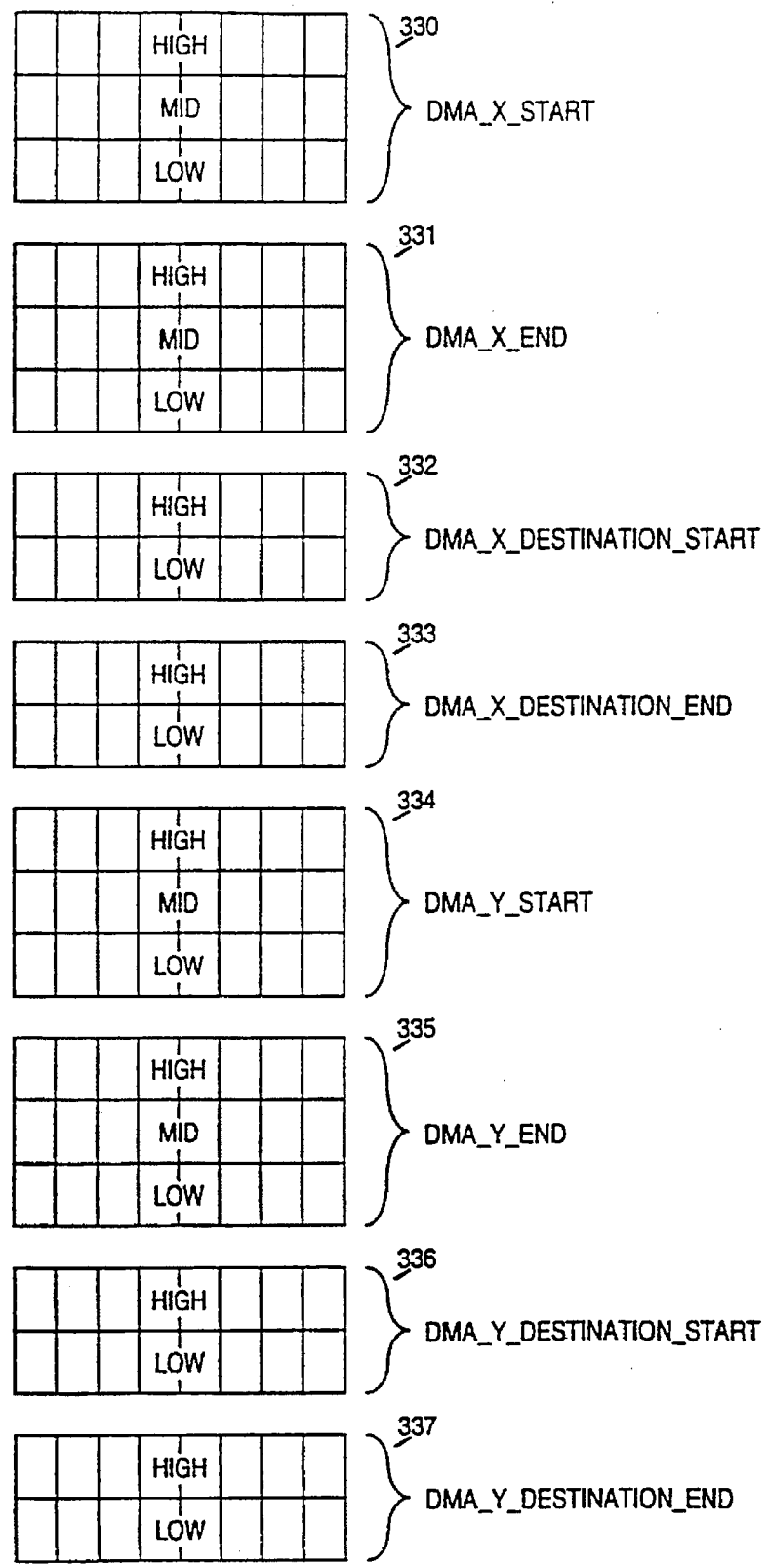

Memory map 85 shows the memory map with the DMA X region 88 enabled. The ASIC 29 is not in exception mode. The DMA X region 82 can start from any address and end at any address in the CPU 33 address space. The start and end is specified in the DMA_X_start register 330 and DMA_X_end register 331, respectively (FIG. 14). The region can be mapped to any region in the RAM 27, so long as the address alignment is modulus 256. This region is defined by registers DMA_X_destination_start 332 and DMA_X_destination_end 333.

Memory map 92 is the same as memory map 79 except that the DMA X region 88 is enabled. The ASIC 29 is in exception mode.

Memory map 99 is the same as memory map 92 except that the ROM code region 105 (and with it the control register region 104) is enabled. The ASIC 29 is in exception mode. The ROM code region 105 is defined in a similar manner as the RAM code region 82, using start and end registers 344 through 347 (FIG. 15). The control register region 104 is mapped into the top 256 bytes of the ROM code region 105.

Not shown in FIG. 4 is the DMA Y region or the address patch table. The address patch table is mapped to a region in the RAM 27 starting at the address in the address_patch_destination_start register 320 (FIG. 13).

Also not shown are the duplicate mappings of the address map control register 310, transition control register 314 and transition_address register 324 into the top 8 bytes (using 1 byte of each 16-bit word) of the exception region 78. In the presently preferred embodiment, the top 8 bytes of the exception region 78 are not used by the CPU 33, nor are they usually used during program execution. The registers are mapped to these addresses because they must be visible in all memory maps if there is to be a means for the CPU 33 to transition the memory map.

Finally, there are the individual patch addresses that are scattered throughout the cartridge ROM region 73. Each patch address is specified in one of the 16 registers address_patch_0 322 through address_patch_15 323 as shown in FIG. 13.

Figure 17:
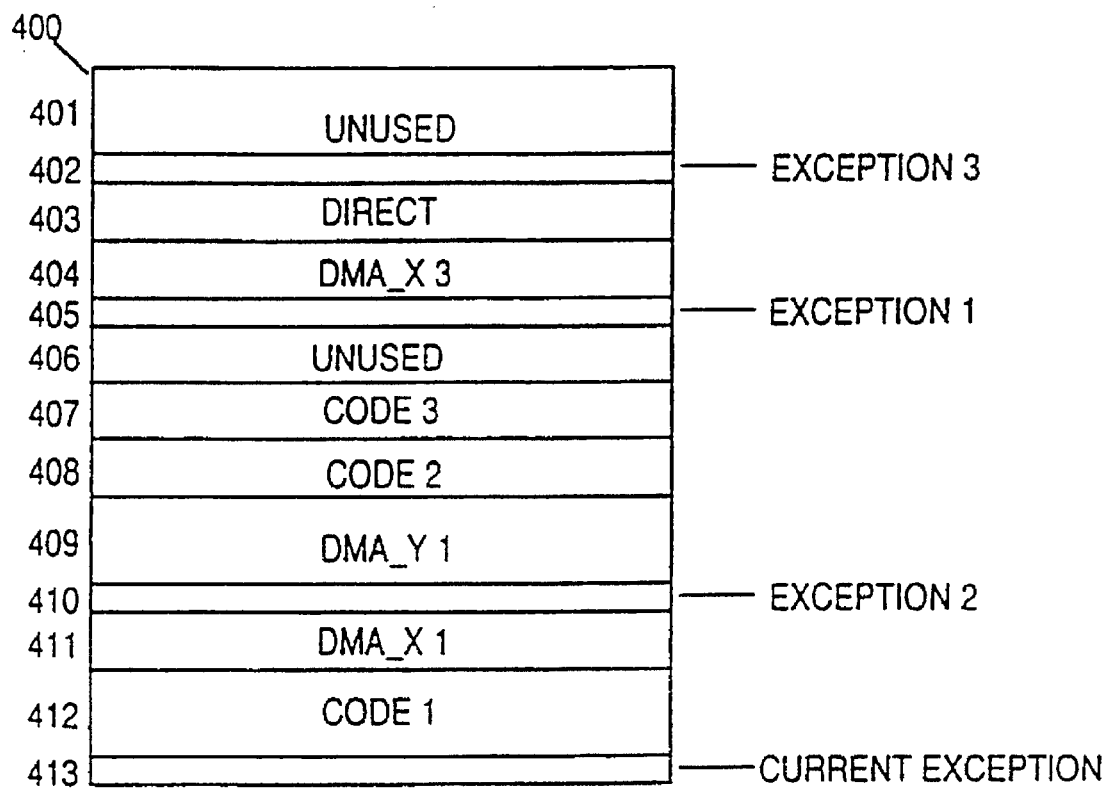
FIG. 17 illustrates an example of the enhancer RAM address map of the preferred embodiment.

It is often the case that the RAM 27 is loaded with DMA, code, and exception regions for the enhancement of several cartridges at once. When a given cartridge 1 is attached to the enhancer 4 and power is applied, the operating system identifies the cartridge and, if the enhancements to that cartridge have been loaded into RAM 27, the operating system enables the appropriate regions. Normally, the regions do not have to be moved in RAM 27 since the start and end region registers allow them to be located anywhere in RAM 27 (modulus 256). The exception region 78, however, must be located at the same address as the exception region of the CPU 33, addresses $000000 through $0000FF in the presently preferred embodiment with a 68000 CPU 33, so copies of the exception regions for the enhancements of various cartridges are scattered throughout RAM 27, to be moved in the exception region 78 upon startup. A sample map 400 of RAM 27 is shown in FIG. 17. Each number after a region name designates a cartridge. Thus, cartridge number 1 has an exception region 405, a RAM code region 412, a DMA X region 411, and a DMA Y region 409. If upon startup the operating system determines that cartridge 1 is attached to the enhancer 4, exception region 405 is copied into the current exception region 413. Note that unless the RAM 27 is completely full, there will be some unused regions 401 and 406. If the unused regions become too fragmented, the map 400 can be easily compacted, leaving the unused area as one contiguous block.

Modem Interface

The modem 24 (FIG. 2) used in the presently preferred embodiment is a 2400 bps V.22bis standard modem. The modem 24 was chosen because it is inexpensive. The registers of the modem 24 are accessed by the CPU 33 by enabling the ROM code region 82 (FIG. 4) or in a fixed block 53 (FIG. 3) in the address space when the cartridge is disabled.

The data to be sent to the modem 24 or received from the modem 24 is buffered by the ASIC 29. This is because it is highly desirable to be able to read and write the modem 24 data only during vertical blanking (i.e. once a video frame time) in order to reduce interference with video game execution. A 2400 bps modem can transmit or receive approximately 4 bytes per NTSC frame time (60 frames/second, 8 bits, 1 start bit, 1 stop bit per byte. 2400÷(8+1+1)÷60=4. So at least 4 bytes of FIFO is required. 8 bytes of FIFO on send and receive is provided in the presently preferred embodiment (see FIG. 16).

Figure 16:
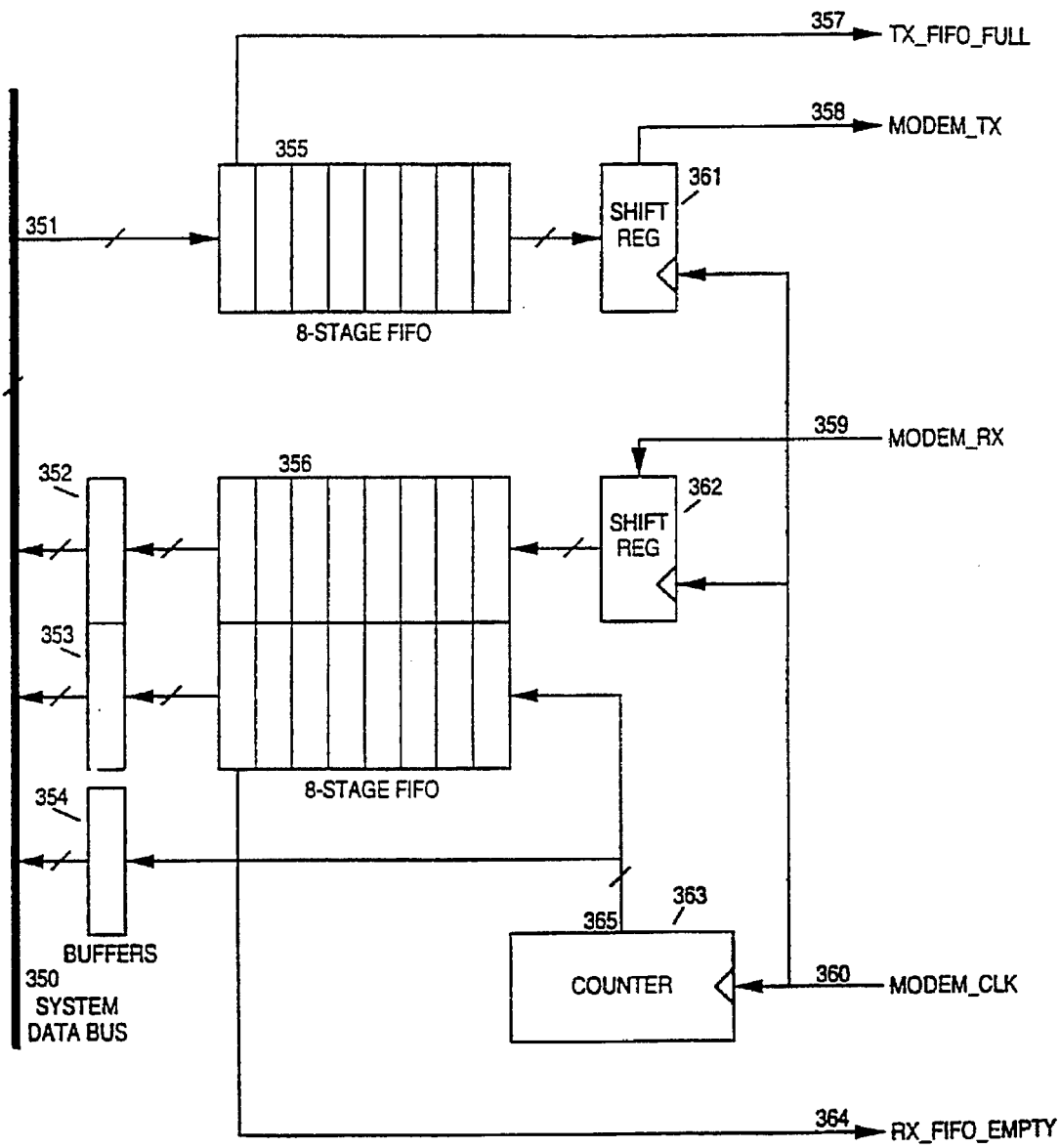
FIG. 16 illustrates the modem interface logic of the preferred embodiment.

The data is transmitted and received serially, clocked by modem_clk 360 from modem 24. As shown in FIG. 16, the transmit data is written to 8-stage FIFO 355 before being serialized in shift register 361 (FIG. 16). The receive data is deserialized in shift register 362, before being written into 8-stage FIFO 356. The counter 363 is also clocked by modem_clock 360 and its count value is stored alongside the receive data in FIFO 356 as a time stamp. The receive data, the time stamp, and the current counter value is read by the CPU 33 (at register addresses that enable buffers 352, 353, and 354). By comparing the time stamp value with the current counter value, the amount of elasped time since the data was received from the modem 24 can be determined. This information is valuable in establishing and maintaining synchronization with another video game over the modem. For example if two video games with the enhancer 4 each transmit a byte at the start of vertical blanking, a comparison can be made between the time the byte is received at the time of the local vertical blanking. If the time stamp increases over time, then it is known that one video game is drifting ahead of the other and appropriate compensation can be effected.

Smart Card Interface

The smart card interface in ASIC 29 conforms to ISO standards to interface to synchronous and asynchronous smart cards. The implementation is well known in the art. The control registers map into the control register region 104 (FIG. 4). In an alternative embodiment, a credit card with a magnetic strip can also be used for the storage of information used in the manner described above.

Logic Implementation

Figure 5:
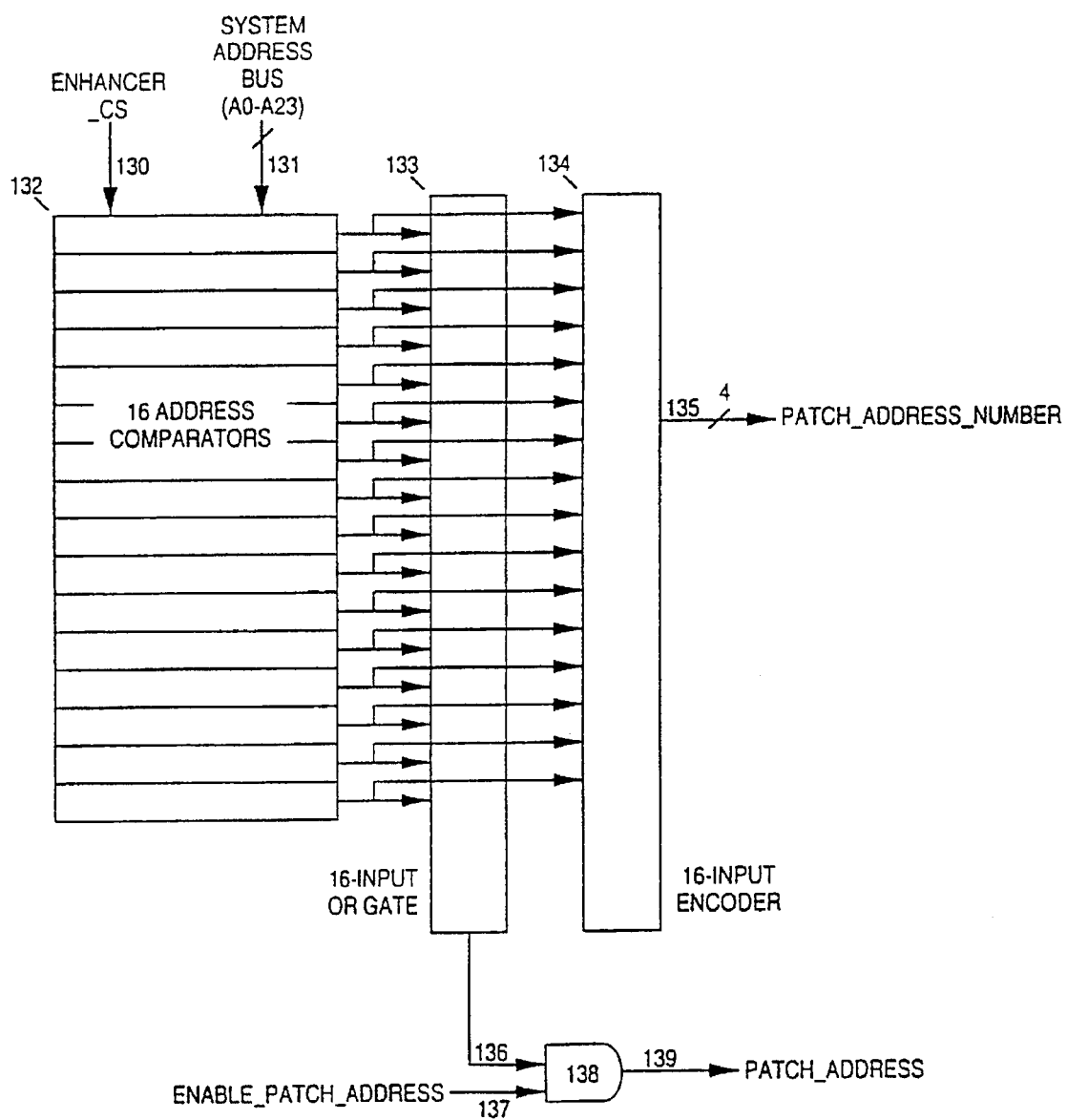
FIG. 5 illustrates the patch address comparators and the encoder of the preferred embodiment.

The presently preferred embodiment utilizes the following hardware implementation. As shown in FIG. 5, sixteen address comparators 132 are used to determine whether a CPU 33 access matches a patch address. If one of the comparators matches to an access on the system address bus 131, the output of the 16-input or-gate 133 enables patch_address 139. Also, the 16-input encoder 134 produces a 4-bit number identifying the patch number.

Figure 6:
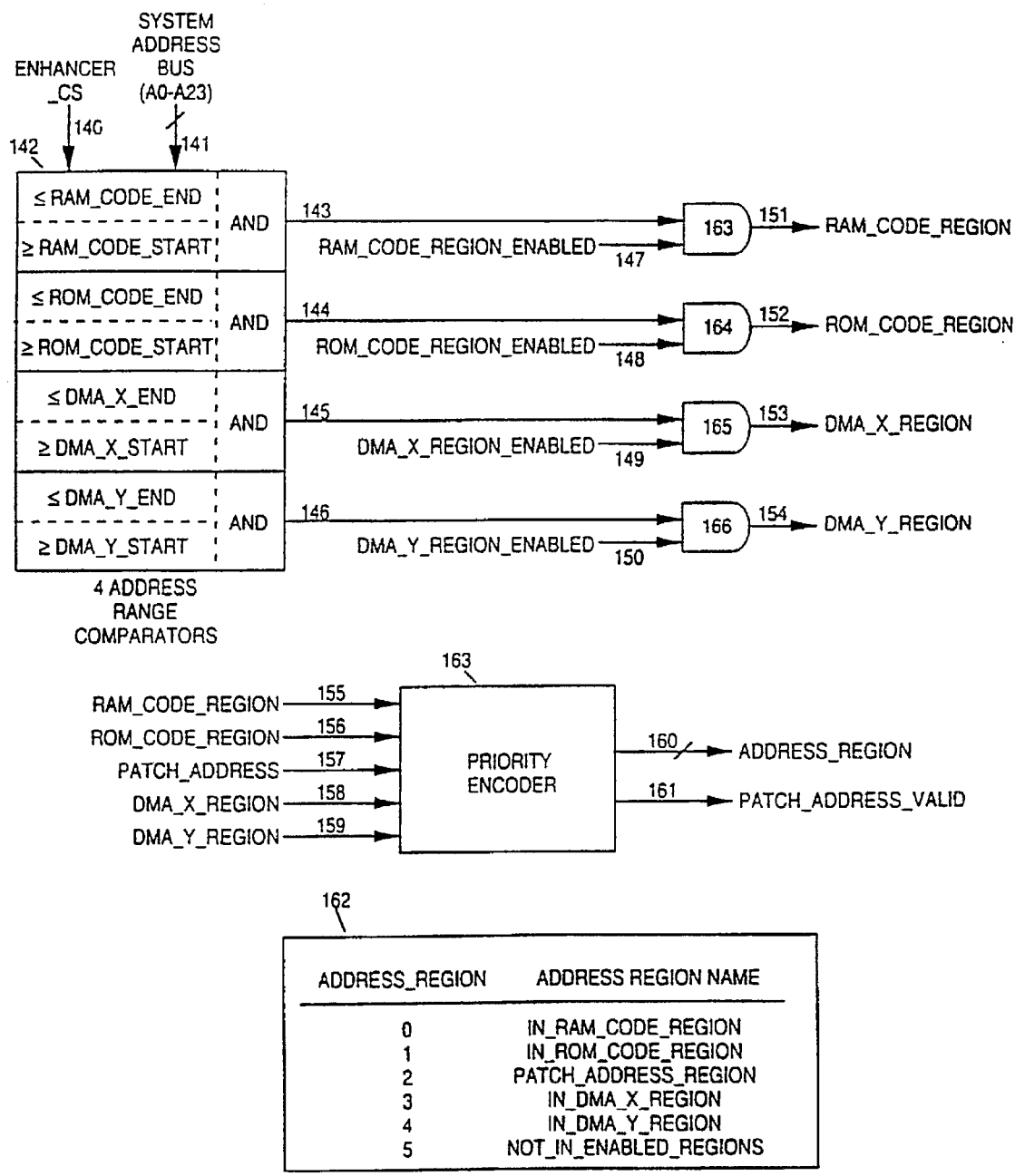
FIG. 6 illustrates the address range comparators of the preferred embodiment.

As shown in FIG. 6, four address range comparators determine whether a CPU 33 access falls within the RAM code, ROM code, DMA X, or DMA y regions. If it does and a region is enabled, the priority encoder 163 provides a 3-bit address_region number identifying the matched region. Since it is possible for regions (and patch addresses) to overlap, the priority encoder 163 determines which region is considered to match. The prioritization is, high to low, from inputs 155 to 159.

Figure 7:
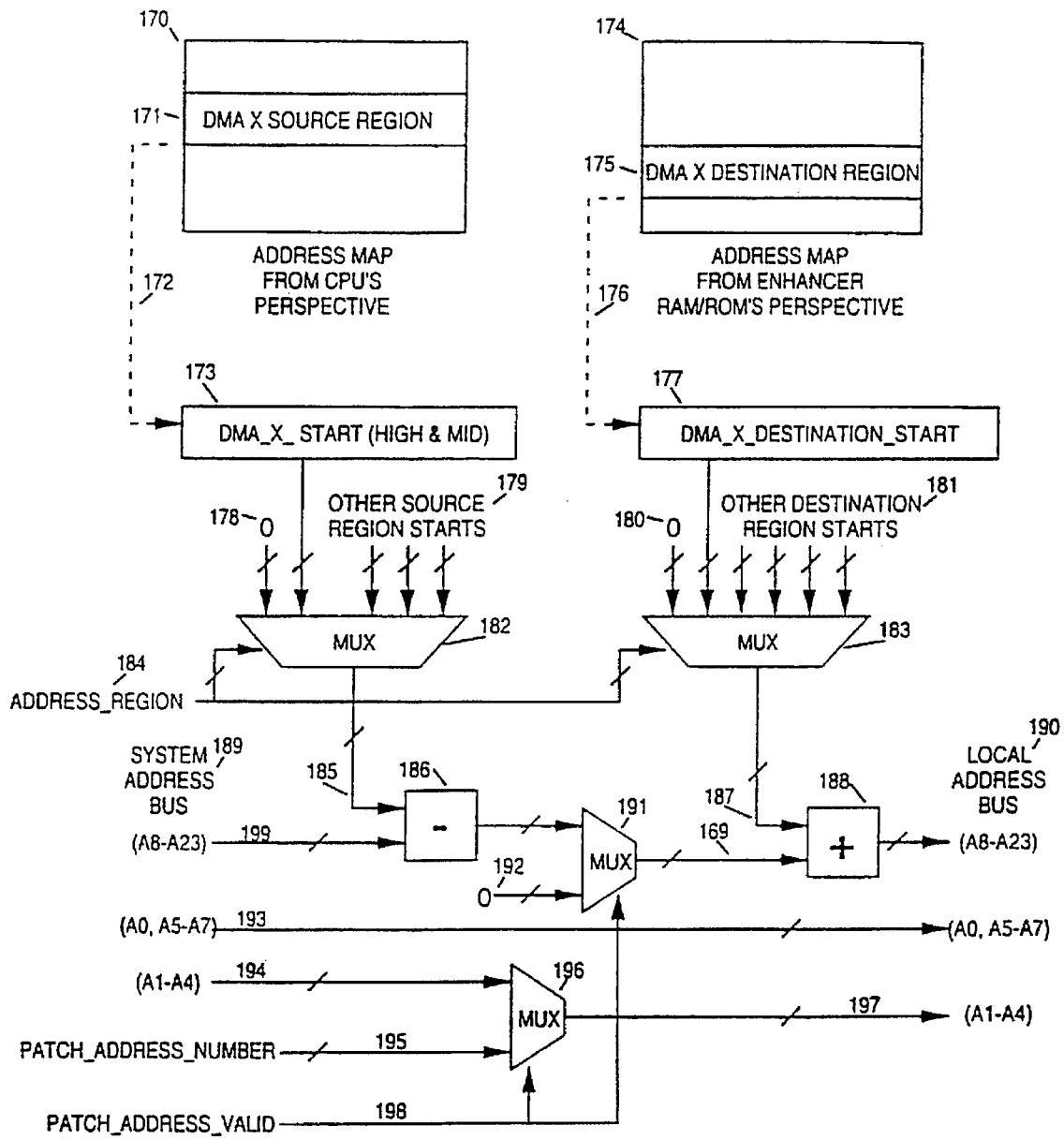
FIG. 7 illustrates the address remapping logic of the preferred embodiment.

FIG. 7 shows how system address bus 189 addresses are remapped to local address bus 190 addresses. DMA X region is shown as an example. The DMA_X_start register 173 is subtracted from the upper 16 bits 199 of incoming system address bus 189 and added to the DMA_X_destination_start register 177. The lower 8 bits 193 and 194 of system address bus 189 are passed through unchanged to local address bus 190 lower 8 bits 193 and 197. If an access is made to RAM code, ROM code, or DMA Y regions, a similar remapping is made.

Still in FIG. 7, if an access is made to the patch address table, a 0 (192) replaces the upper 16 bits of the system address bus 189 and the address_patch_destination_start register 320 (FIG. 13) is added. The patch_address_number 195 replaces A1–A4 of the system address bus 189. A0, A5–A7 are passed through unchanged. The patch table in the RAM 27 is made up of 16 bit entries, so A0 identifies if the access is on an even boundary or a byte access on an odd boundary. A5 through A7 may vary, so the patch table must be repeated 8 times in RAM 27, filling up a 256-byte area (i.e. 16 entries, 2 bytes per entry, repeated 8 times, 16×2×8=256). This repetition is not wasteful of RAM 27 since all regions are mapped to no better than modulus 256 in RAM 27 and no other region could use the space.

Still in FIG. 7, if an access is made to the direct RAM regions 54 and 61, direct ROM regions 56 and 61 or direct register region 53 (FIG. 3), zeroes (178 and 180) are added and substracted to the system address bus 189, resulting in the system address bus 189 being passed through to the RAM 27 unchanged.

Figure 8:
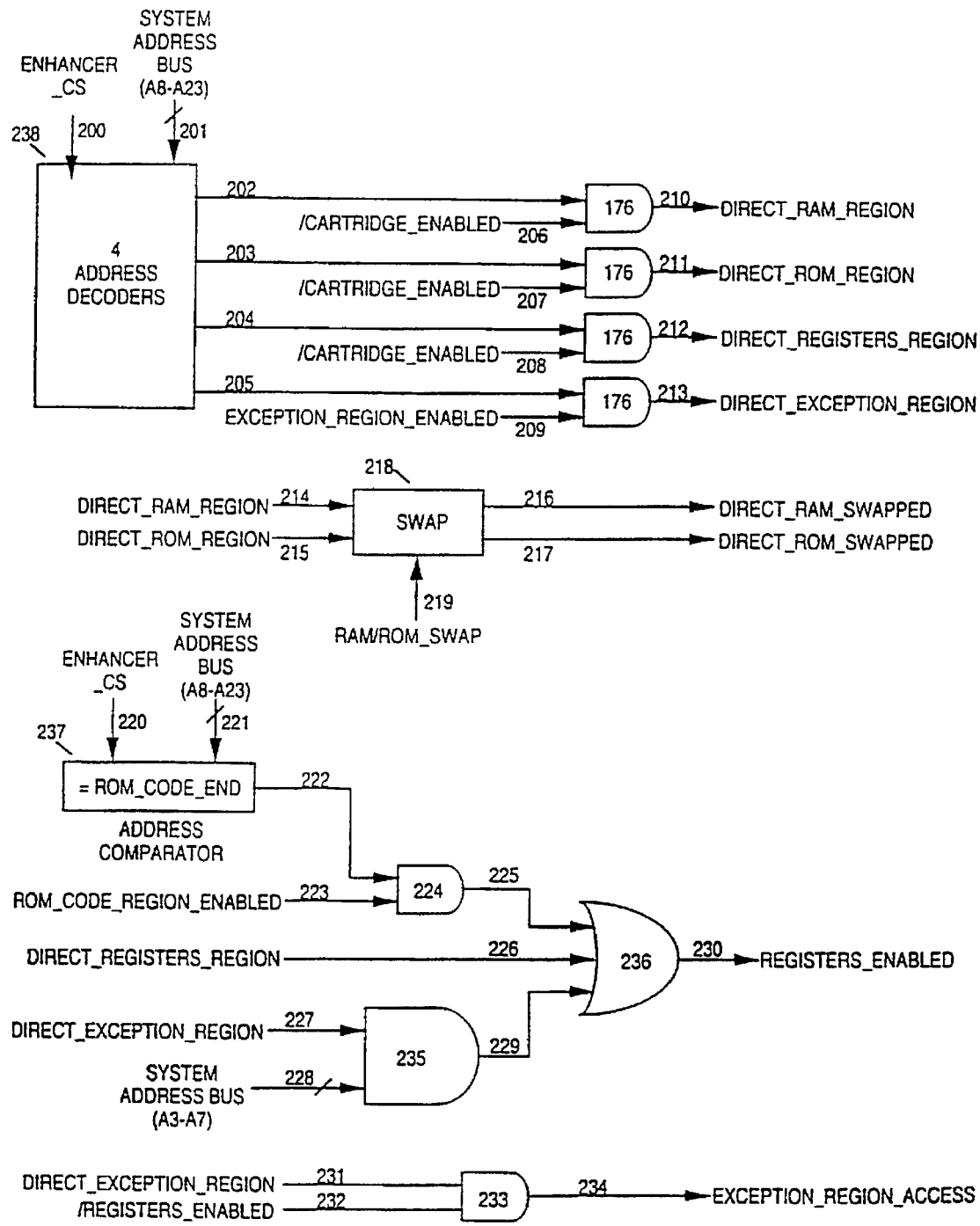
FIG. 8 illustrates the address decoding logic of the preferred embodiment.

FIG. 8 shows the overall address decoding for the card. The direct regions are decoded by decoders 238 and enabled only when the cartridge is disabled (as shown in FIG. 3). The RAM and ROM direct region decoding is swapped by switch 218 if so directed by the RAM/ROM_swap bit in the address map control register 310 (FIG. 12). The control registers are enabled by either matching to the top 256 bytes of the ROM code region 105 (FIG. 4) with address comparator 237, by decoding the direct register region 226, or by decoding the top 8 bytes of the exception region 78.

Figure 9:
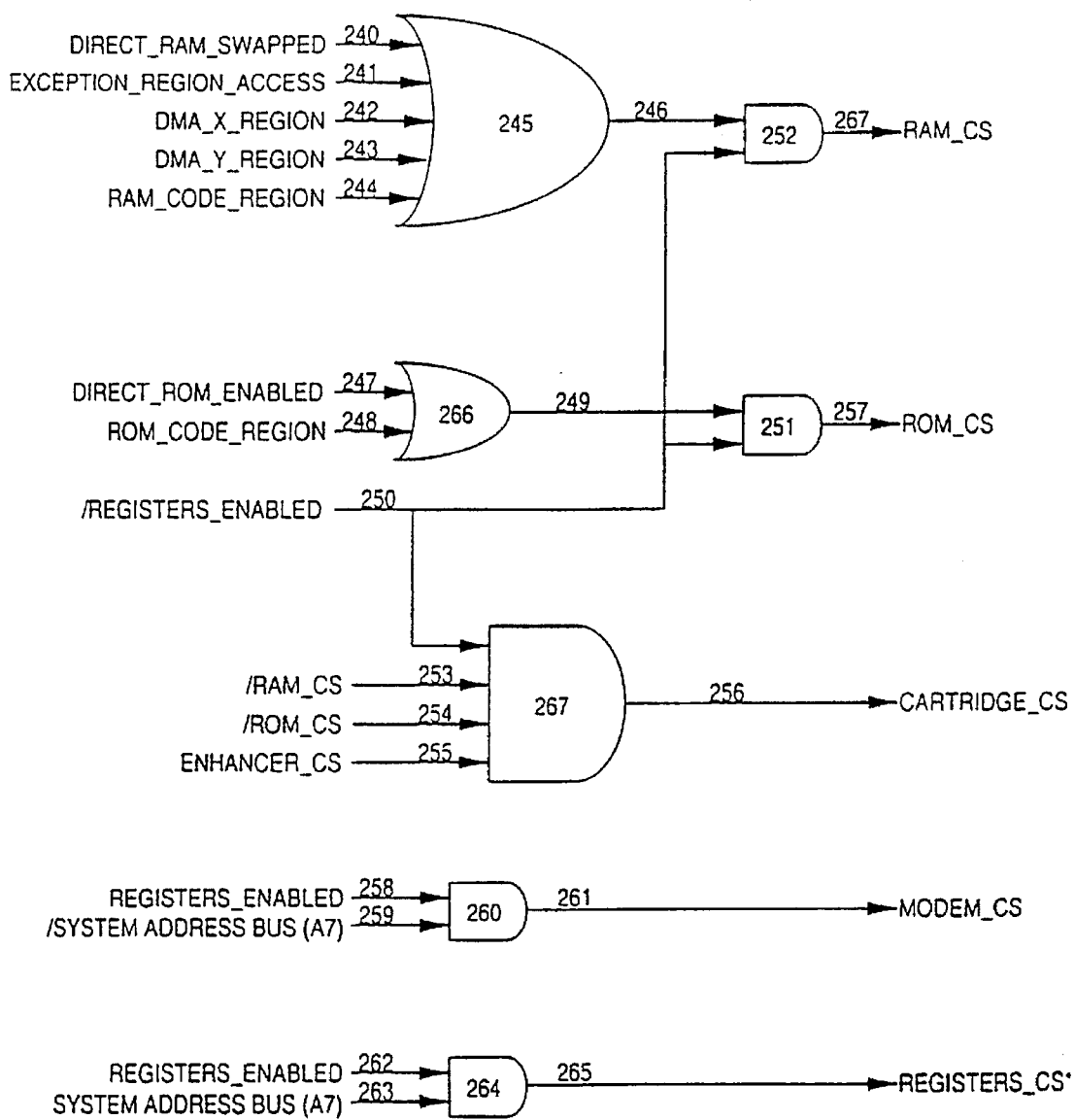
FIG. 9 illustrates the chip select generation logic of the preferred embodiment.

FIG. 9 shows the chip select generation. Any RAM region enables RAM, so long as registers are not enabled (or-gate 145 and and-gate 252). Any ROM region enables ROM, so long as registers are not enabled (or-gate 266 and and-gate 251). The cartridge is enabled when the enhancer 4 is chip selected, but no enhancer 4 devices are enabled (and-gate 267). The modem 24 registers are enabled when the registers are enabled, and the lower 128 bytes of the 256-byte register region is accessed (and-gate 260). The ASIC 29 registers are enabled when the upper 128 bytes of the 256-byte register region is accessed, or if the top 8 bytes of the exception region are accessed (and-gate 264).

Figure 10:
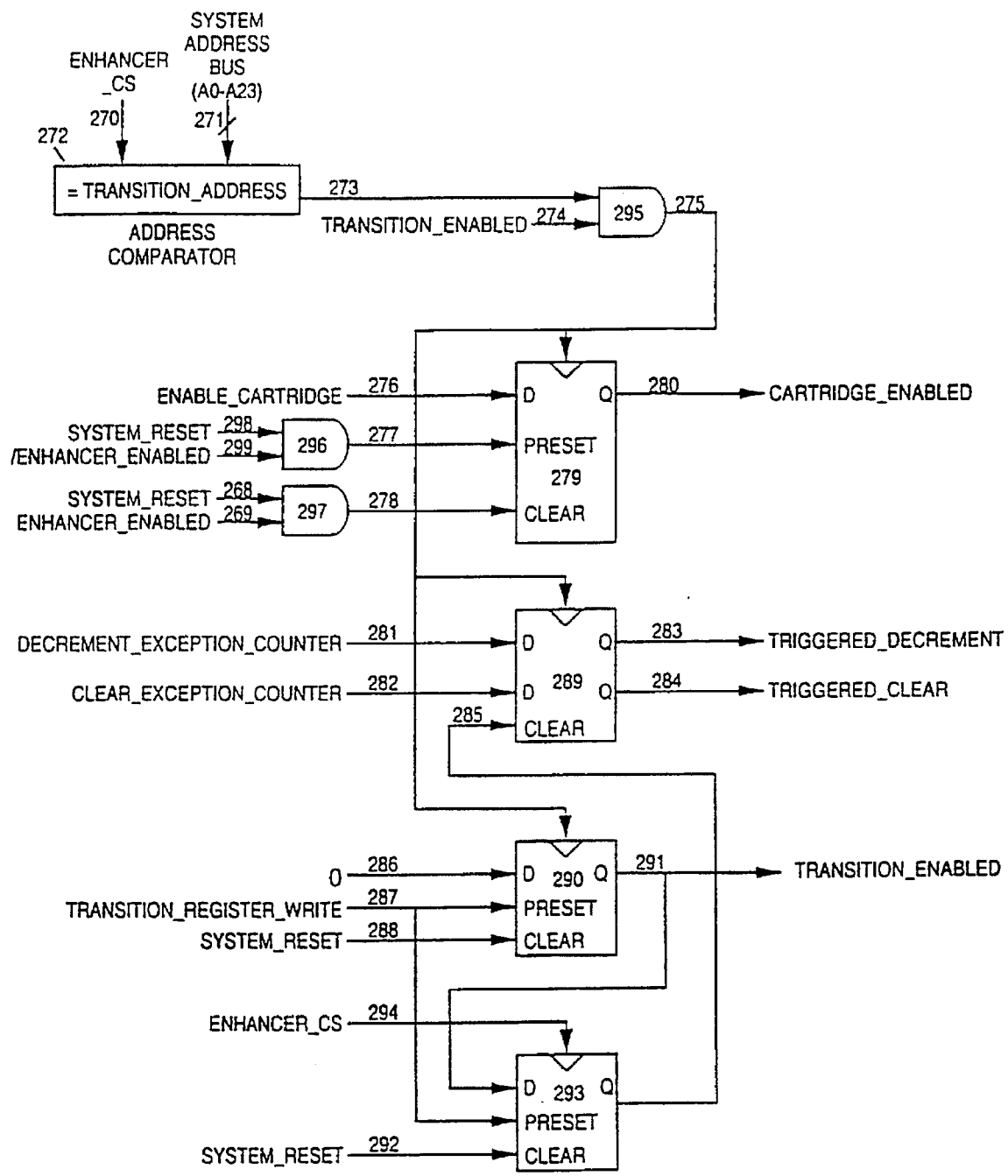
FIG. 10 illustrates the transition state machine of the preferred embodiment.

FIG. 10 shows the state machine that implements the transition address logic. The transition_register_write signal 287 is activated while the transition_address register 324 (FIG. 13) is being written to. This signal primes the state machine. When the CPU 33 accesses the transition address stored in transition_address register 324, flip-flops 279, 289, and 290 are clocked. This causes the signals enable_cartridge 276, decrement_exception_counter 281, and clear_exception_counter 282 to be latched by the flip-flops. Cartridge_enabled 280, if it changes, transitions the address map between those shown in FIG. 3 and those shown in FIG. 4. Triggered_decrement 283, if enabled, decrements exception counter 307 and triggered_clear clears exception counter 307. The next access to the enhancer activates enhancer_cs 294 which resets the state machine.

Alternative Embodiment

A small variation to the presently preferred embodiment is worth mentioning. Rather than having the exception mode be activated when there is an access to the exception region, exception mode can be activated as soon as there is an access to a patch address. This approach is somewhat less flexible in that it is not as simple to redirect the CPU 33 to a convenient patch location in RAM 27, but it does work.

The specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. A video game enhancement apparatus for modifying and enhancing the operation of a video game, said apparatus coupled to a processor and a first memory, said first memory having a means for executing said video game, said apparatus comprising:

a processor interface for coupling said apparatus with said processor;

a memory interface for coupling said apparatus with said first memory;

a second memory having a means for enhancing the operation of said video game in said first memory, said means for enhancing the operation of said video game including:

a means for generating a first trigger signal upon a predetermined processor access to said first memory;

a means for redirecting said predetermined processor access from said first memory to a patch address in said second memory, said patch address having a pointer to a patch table having a plurality of instructions, each of said plurality of instructions corresponding to a plurality of data;

a means for activating an exception mode; and a means for executing one of said plurality of instructions in said patch table in said second memory.

2. The video game enhancement apparatus as claimed in claim 1 wherein said means for enhancing the operation of said video game further includes:

a means for generating a second trigger signal upon a predetermined processor access to said second memory; and a means for redirecting said predetermined processor access from said second memory to said first memory, thereby continuing operation of said video game in said first memory.

3. The video game enhancement apparatus as claimed in claim 1 wherein said means for redirecting said predetermined processor access from said first memory to said second memory includes a means for accessing said first memory that does not overlap access to said second memory.

4. The video game enhancement apparatus as claimed in claim 1 wherein said means for redirecting said predetermined processor access from said first memory to said second memory includes a means for accessing said first memory that overlaps access to said second memory.

5. The video game enhancement apparatus as claimed in claim 1 wherein said means for redirecting said predetermined processor access from said first memory to said patch address in said second memory further includes a means for substituting a new instruction from said plurality of instructions in said patch table for an original instruction stored in said first memory.

6. The video game enhancement apparatus as claimed in claim 5 wherein said new instruction is a trap instruction.

7. The video game enhancement apparatus as claimed in claim 1 wherein said means for redirecting said predetermined processor access from said first memory to said patch address in said second memory further includes a means for substituting new data stored in said second memory for original data stored in said first memory.

8. The video game enhancement apparatus as claimed in claim 1 wherein the contents of said patch table are modifiable by said processor.

9. The video game enhancement apparatus as claimed in claim 1 wherein said means for redirecting said predetermined processor access from said first memory to said patch table in said second memory further includes a means for disabling said means for redirecting upon said processor access to a location outside of a predetermined address range while said exception mode is active.

10. The video game enhancement apparatus as claimed in claim 9 wherein said processor access to a location outside of a predetermined address range while said exception mode is active is a DMA access.

11. The video game enhancement apparatus as claimed in claim 1 wherein said means for redirecting said predetermined processor access from said first memory to said patch table in said second memory further includes a means for disabling said means for redirecting upon said processor access to a location within a predetermined address range while said exception mode is active.

12. The video game enhancement apparatus as claimed in claim 1 further including a counter for counting a number of times that said exception mode is activated, said counter also for counting a number of times that said exception mode is terminated, said means for redirecting said predetermined processor access from said first memory to said patch address in said second memory further including a means for incrementing said counter upon activation of said exception mode and terminating said exception mode only if said counter is equal to zero.

13. The video game enhancement apparatus as claimed in claim 1 further including an insertable removable card interface for coupling said apparatus to an insertable removable card.

14. The video game enhancement apparatus as claimed in claim 1 further including a modem connection for coupling said apparatus to a modem.

15. A network video game enhancement system for modifying and enhancing the operation of a video game, said system comprising:

a network;

a processor;

a modem coupled to said processor, said modem for connecting said processor to said network;

a first memory coupled to said processor, said first memory having a means for executing said video game; and a second memory coupled to said processor, said second memory having a means for enhancing the operation of said video game, said means for enhancing the operation of said video game including a means for generating a first trigger signal upon a predetermined processor access to said first memory;

a means for redirecting said predetermined processor access from said first memory to a patch address in said second memory, said patch address having a pointer to a patch table having a plurality of instructions, each of said plurality of instructions corresponding to a plurality of data;

a means for activating an exception mode;

a means for executing one of said plurality of instructions in said patch table in said second memory;

a means for generating a second trigger signal upon a predetermined processor access to said second memory; and a means for redirecting said predetermined processor access from said second memory to said first memory upon activation of said second trigger signal, thereby continuing operation of said video game in said first memory.

16. The network video game enhancement system as claimed in claim 15 wherein said network is a telephone network.

17. The network video game enhancement system as claimed in claim 15 wherein said network is a cable television network.

18. The network video game enhancement system as claimed in claim 15 further including:

a means for connecting said video game system to a server on said network;

a means for downloading information from said server to said second memory; and a means for altering functionality of said video game based on said information received from said server.

\* \* \* \* \*